US012766748B2

(12) United States Patent
Jia

(10) Patent No.: US 12,766,748 B2
(45) Date of Patent: Oct. 20, 2026

(54) JOINT MODULE AND JOINT ROBOT

(71) Applicant: ZEROERR CO., LTD., Shenzhen (CN)

(72) Inventor: Xiqing Jia, Shenzhen (CN)

(73) Assignee: ZEROERR CO., LTD., Shenzhen City (CN)

( * ) Notice: Subject to any disclaimer, the term of this patent is extended or adjusted under 35 U.S.C. 154(b) by 185 days.

(21) Appl. No.: 18/635,497

(22) Filed: Apr. 15, 2024

(65) Prior Publication Data

US 2025/0135666 A1 May 1, 2025

(30) Foreign Application Priority Data

Oct. 25, 2023 (CN) ......................... 202311395990.9
Oct. 25, 2023 (CN) ......................... 202322883869.2
Feb. 6, 2024 (CN) ......................... 202420288452.3

(51) Int. Cl.
*B25J 17/00* (2006.01)
*B25J 9/10* (2006.01)
*B25J 19/00* (2006.01)
*B25J 13/08* (2006.01)

(52) U.S. Cl.
CPC ......... *B25J 19/0075* (2013.01); *B25J 9/1025* (2013.01); *B25J 17/00* (2013.01); *B25J 19/0004* (2013.01); *B25J 13/088* (2013.01)

(58) Field of Classification Search
CPC ...... B25J 17/00; B25J 19/0075; B25J 9/1025; B25J 17/0241; B25J 19/0004; B25J 13/088
See application file for complete search history.

(56) References Cited

FOREIGN PATENT DOCUMENTS

CN 208117853 U * 11/2018
CN 218837821 U * 4/2023

OTHER PUBLICATIONS

Machine translation of CN-208117853-U (Year: 2018).*
Machine translation of CN-218837821-U (Year: 2023).*

* cited by examiner

*Primary Examiner* — Randell J Krug
(74) *Attorney, Agent, or Firm* — Cheng-Ju Chiang

(57) ABSTRACT

Disclosed are a joint module and a joint robot. The joint module includes a mounting shell and a joint body. The mounting shell includes a joint mounting portion and an input sleeve which are connected to each other. The central axis of the joint mounting portion is perpendicular to the central axis of the input sleeve. The joint body is provided with an output cover. The central axis of the joint mounting portion is perpendicular to the central axis of the input sleeve, and the projection of the output cover on the input sleeve does not protrude out of the peripheral edge of the input sleeve, thereby enabling the overall appearance of the joint module to be regular and compact, and reducing mutual interference between the joint module and the external environment, so as to improve the application effect of the joint module.

26 Claims, 20 Drawing Sheets

JOINT MODULE AND JOINT ROBOT

CROSS-REFERENCE TO RELATED APPLICATIONS

This application claims priority to Chinese Patent Application No. 202311395990.9, named "Joint Module and Joint Robot" and filed on Oct. 25, 2023, priority to Chinese Patent Application No. 202322883869.2, named "Joint Module and Joint Robot" and filed on Oct. 25, 2023, and priority to Chinese Patent Application No. 202420288452.3, named "Joint Module and Joint Robot" and filed on Feb. 6, 2024. All of the aforementioned applications are incorporated herein by reference in their entireties.

TECHNICAL FIELD

The present disclosure relates to the technical field of joint modules, and in particular, to a joint module and a joint robot.

BACKGROUND

With the rapid development of industrial automation technology, robots have become more and more attention as an important industrial automation device, and are becoming more and more widely used. In the robot-related technology, the control of moving parts such as a robot joint is most important and critical. In the related art, the robot joint is connected to the mechanical arm through the output cover to drive the mechanical arm to rotate; and the input sleeve is connected to the power input structure to move along with the power input structure. In the robot joint in the prior art, the output cover completely protrudes out of the edge of the input sleeve, so that the overall shape of the joint module is not regular enough, and the joint module often interferes with the external environment in the application to affect the application effect of the joint module.

SUMMARY

The application provides a joint module, which aims to solve the technical problem of how to improve the application effect of the joint module.

In order to achieve the above purpose, the joint module provided in this application includes a mounting shell, and a joint body. The mounting shell comprises a joint mounting portion and an input sleeve connected to the joint mounting portion, the joint mounting portion defines a joint mounting cavity, and the input sleeve is configured to be connected to an external power input structure to enable the external power input structure to drive the joint module to move; a central axis of the joint mounting portion is perpendicular to a central axis of the input sleeve; the joint body is partially mounted in the joint mounting cavity, the joint body has an output cover, the output cover is located out of the joint mounting cavity, and a middle part of a projection of the output cover on the input sleeve does not protrude out of a peripheral edge of the input sleeve.

In the technical solution of the joint module of the present application, the central axis of the joint mounting portion is perpendicular to the central axis of the input sleeve, and the middle part of the projection of the output cover on the input sleeve does not protrude out of the peripheral edge of the input sleeve, thereby enabling the overall appearance of the joint module to be regular and compact, and reducing mutual interference between the joint module and the external environment, so as to improve the application effect of the joint module.

BRIEF DESCRIPTION OF THE DRAWINGS

In order to more clearly illustrate the technical solutions of the embodiments of the present disclosure or the prior art, the accompanying drawings which need to be used in embodiments or prior art descriptions are briefly described below. In an obvious way, the accompanying drawings in the following description are merely some embodiments of the present application. For ordinary technicians in this field who can obtain other drawings according to these drawings without creative labor.

DETAILED DESCRIPTION OF THE EMBODIMENTS

Figure 1:
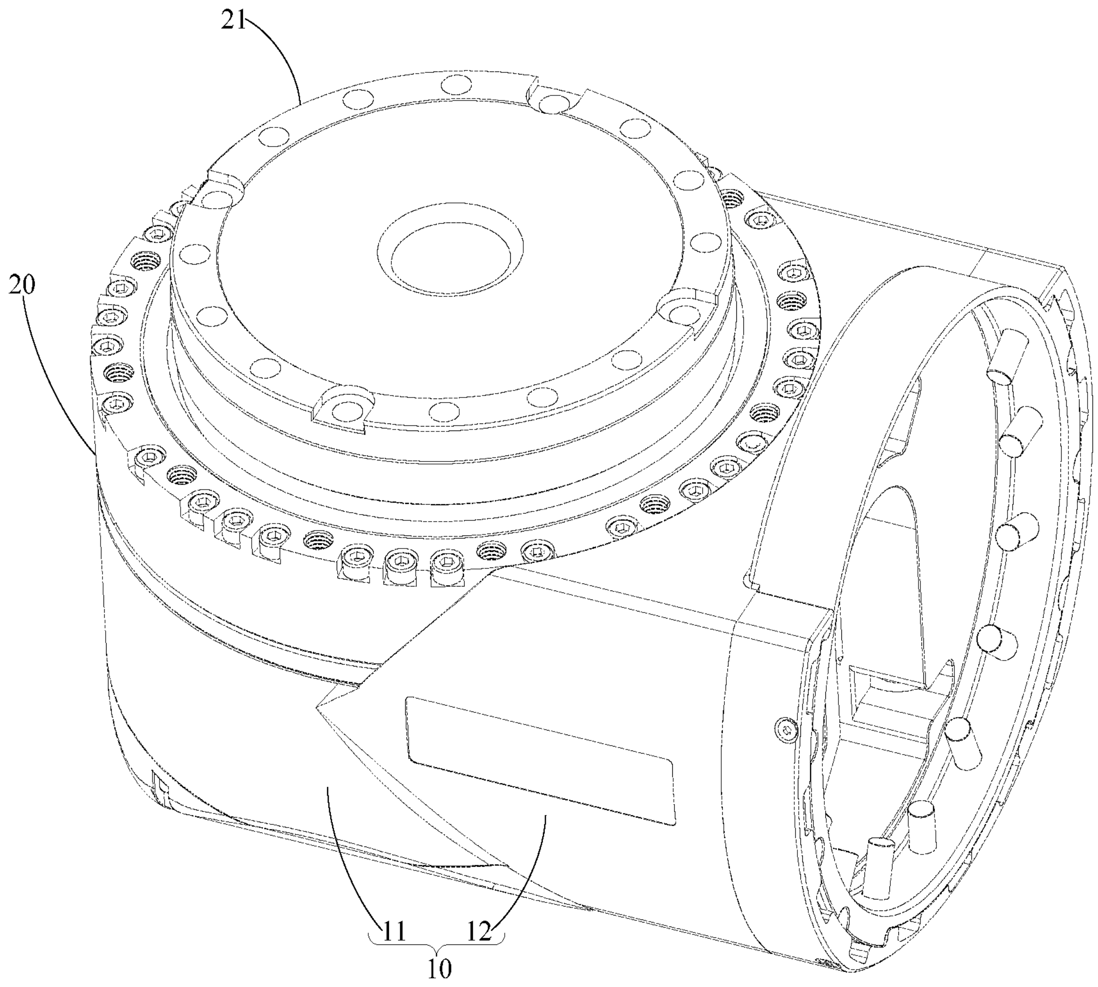
FIG. 1 is a schematic view of an embodiment of a joint module of the present disclosure.

The technical solutions in the embodiments of the presented disclosure will be do a clearly and completely description with the accompanying drawings in the embodiments of the presented disclosure. Obviously, the described embodiments are only a part of the embodiments of the present application, but are not all embodiments. Based on the embodiments of the presented application, all other embodiments are developed and obtained by an ordinary person skilled in the art without any creative efforts, other embodiments obtained thereby are still covered by the present application.

It should be noted that, if the embodiments of the present disclosure relate to directional indication (such as up, down, left, right, front, and back), the directional indication is only used to interpret the relative positional relationship, the motion situation, etc. between the components under a certain specific attitude (as shown in the drawings), and if the specific attitude changes, the directional indication also changes accordingly.

In addition, if the embodiments of the present disclosure relate to descriptions such as "first" and "second", the descriptions of "first", "second" and the like are only used for descriptive purposes. It is not to be understood as indicating or implying their relative importance or implicitly indicating the number of technical features indicated. Thus, the features defined with "first" and "second" may explicitly or implicitly include at least one of the features. In addition, the technical solutions between the various embodiments may be combined with each other. However, a person of ordinary skill in the art must be implemented as a basis. When the combination of the technical solutions is contradictory or cannot be implemented, it should be considered that the combination of the technical solutions does not exist, and is not within the scope of protection of the present disclosure.

With the rapid development of industrial automation technology, robots have become more and more attention as an important industrial automation device, and are becoming more and more widely used. In the robot-related technology, the control of moving parts such as a robot joint is most important and critical. In the related art, the robot joint is connected to the mechanical arm through an output cover to drive the mechanical arm to rotate, and an input sleeve is connected to the power input structure to move along with the power input structure. In the robot joint in the related art, the output cover protrudes from the edge of the input sleeve, which causes the overall shape of the joint module to be not regular enough, and often interferes with the external environment in the application to affect the application effect of the joint module.

The present application provides a joint module, which aims to solve the technical problem of how to improve the application effect of a joint module.

Figure 2:
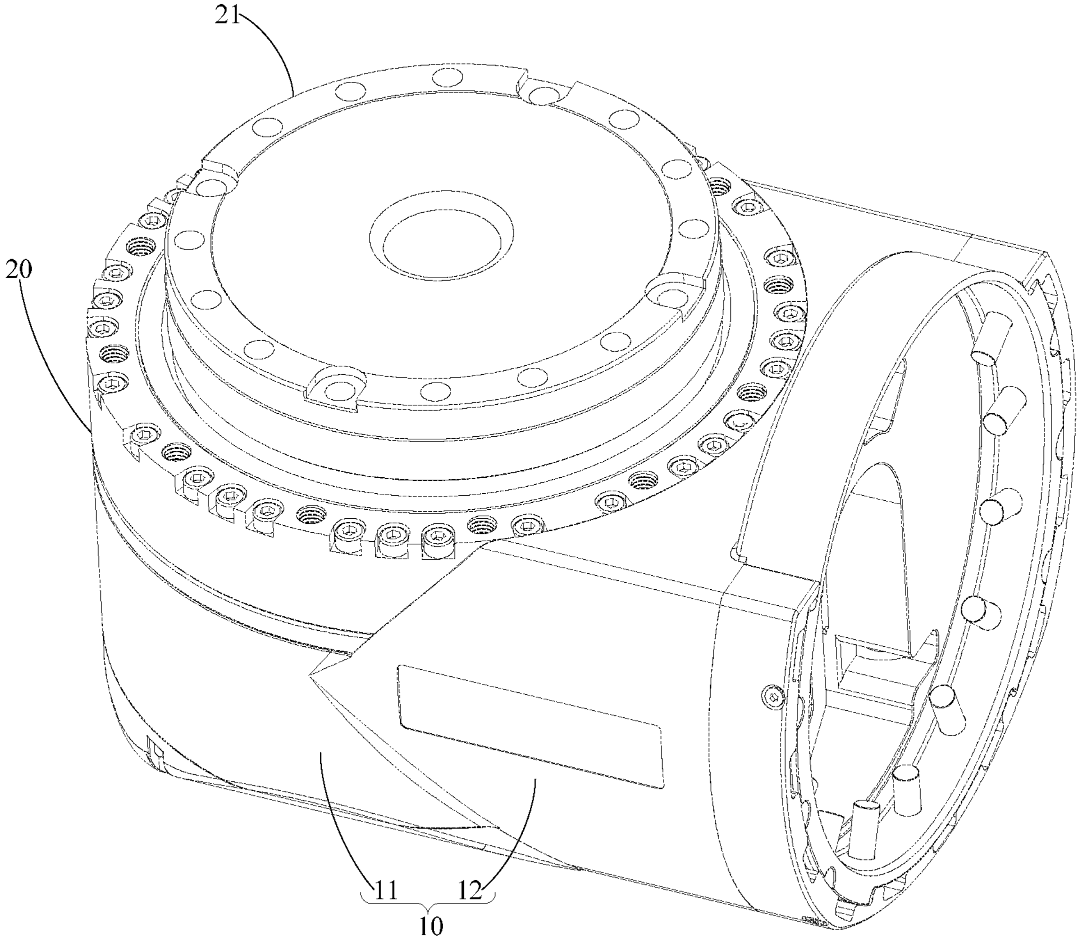
FIG. 2 is another schematic view of a first embodiment of a joint module of the present disclosure.

As shown in FIG. 1 and FIG. 2, the joint module includes a mounting shell 10 and a joint body 20. The mounting shell 10 includes a joint mounting portion 11 and an input sleeve 12 which are connected to each other. The joint mounting portion 11 defines a joint mounting cavity, and the input sleeve 12 is configured to be connected to an external power input structure, so that an external power input structure drives the joint module to move. The central axis of the joint mounting portion 11 is perpendicular to the central axis of the input sleeve 12. The joint body 20 is partially mounted in the joint mounting cavity. The joint body 20 has an output cover 21, the output cover 21 is located out of the joint mounting cavity, and the middle of the projection of the output cover 21 on the input sleeve 12 does not protrude out of the peripheral edge of the input sleeve 12.

In this embodiment, the mounting shell 10 is configured to be mounted to the joint body 20, and the mounting shell 10 is mounted to the external structure to realize the combination of the joint module and the external structure. The external structure may be a power input structure for driving the joint module to move, or may be an external device driven by the joint module, for example, may be a mechanical arm. The output cover 21 is connected to the moving part of the external device to drive the movement part of the external device to move.

It should be noted that the central axis of the joint mounting portion 11 is perpendicular to the central axis of the input sleeve 12 and does not refer to the absolute vertical direction, but there is an error within the allowable range.

Figure 3:
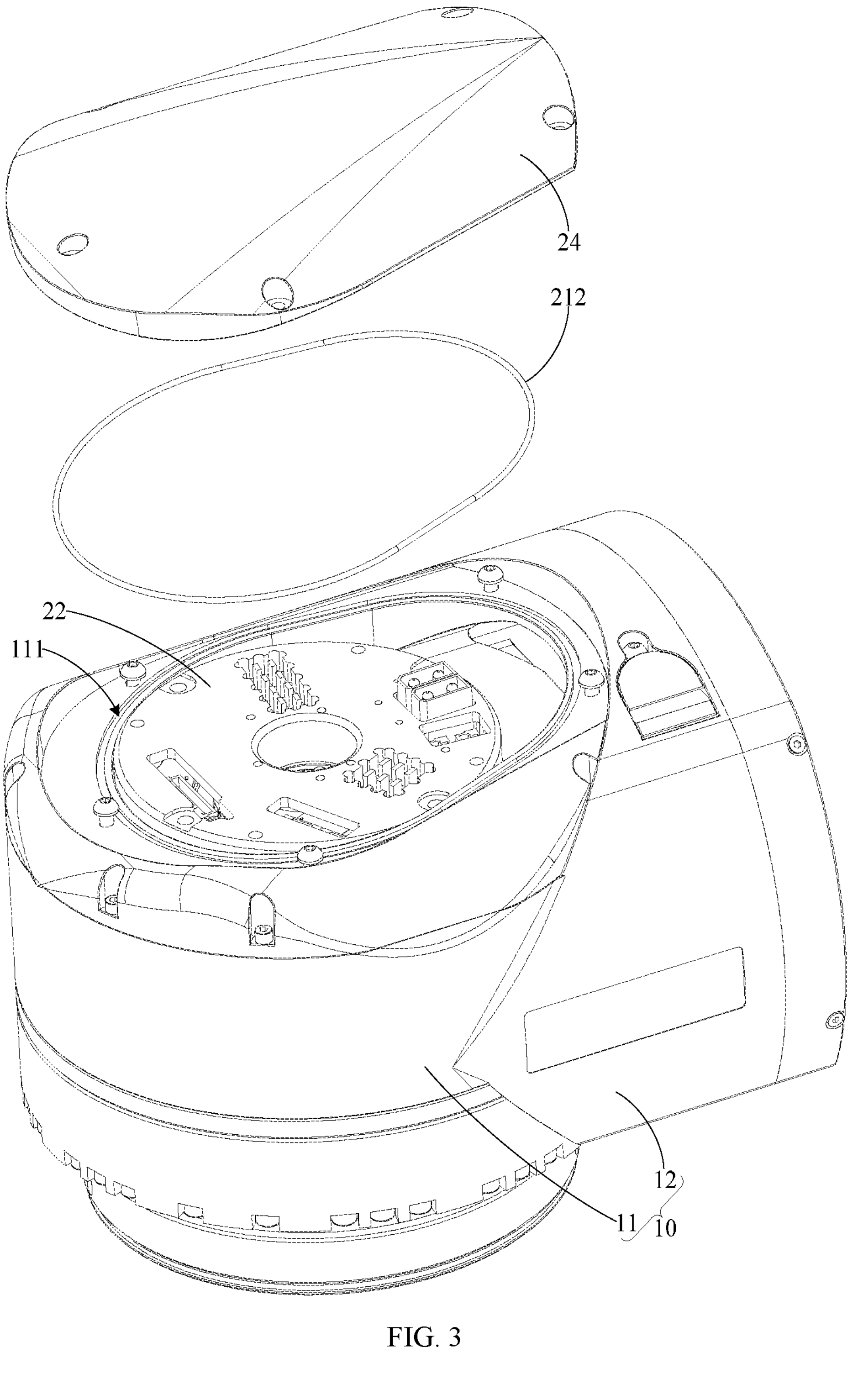
FIG. 3 is a schematic disassembled view of a first embodiment of a joint module of the present disclosure.
Figure 4:
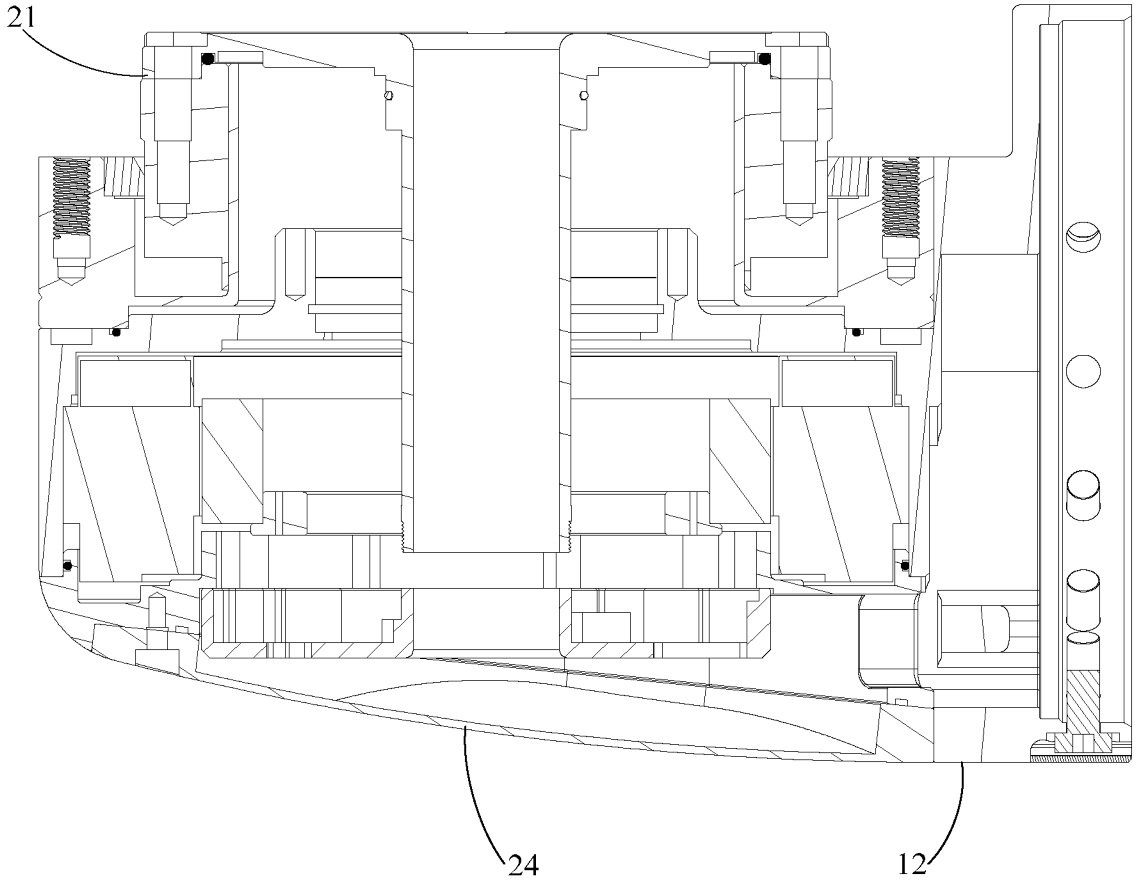
FIG. 4 is a schematic cross-sectional view of a first embodiment of a joint module of the present disclosure.

As shown in FIG. 3 and FIG. 4, the joint body 20 includes a motor assembly 22 and a speed reducer 23 connected in an axial direction, the motor assembly 22 is installed in the joint installation cavity, the speed reducer 23 is installed outside the joint mouting portion 11, and the output cover 21 is disposed on the speed reducer 23; The joint module further includes a protecting cover 24, the protecting cover 24 is detachably covered at an end of the joint mounting portion 11 facing away from the output cover 21, and a projection of the protecting cover 24 on the input sleeve 12 does not protrude from a peripheral edge of the input sleeve 12.

The motor assembly 22 and the speed reducer 23 are connected in the axial direction of the joint body 20, and the rotor of the motor assembly 22 cooperates with the input shaft 231 of the speed reducer 23, so that the motor assembly 22 inputs power to the speed reducer 23, and then the speed reducer 23 adjusts the power to a preset rotation speed and outputs the power through the output cover 21. An end of the motor assembly 22 far away from the speed reducer 23 is provided with an electronic control element such as a circuit board and an encoder, so that the external control terminal is electrically connected. The protecting cover 24 can hide and protect the fixed end of the motor assembly 22, so as to improve the operation stability of the joint body 20. When the electronic control element needs to be overhauled and maintained, the protecting cover 24 can also be opened to expose the fixed end of the motor assembly 22, so as to facilitate maintenance and maintenance of the electronic control element. The projection of the protecting cover 24 on the input sleeve 12 does not protrude out of the peripheral edge of the input sleeve 12, or is flush with the peripheral edge of the input sleeve 12, so that the overall appearance of the joint module can be more regular and compact, to reduce the occupied space of the joint module and preventing the joint module from interfering with other structures in the application environment, thereby improving the application effect of the joint module.

Specifically, as shown in FIG. 3, the outer wall of the joint mounting portion 11 defines a first sealing groove 111, the first sealing groove 111 is annularly disposed at an opening of the joint mounting portion 11, the joint module further includes a first sealing ring 241 embedded in the first sealing groove 111, and an inner wall surface of the protecting cover 24 abuts against the first sealing ring 241. The first sealing ring 241 is capable of improving the sealing performance between the protecting cover 24 and the opening of the joint mounting cavity, so as to prevent external moisture from invading the fixed end of the motor assembly 22, thereby improving the working stability of the joint body 20.

For example, as shown in FIG. 4, the free end of the peripheral wall of the output cover 21 has a step portion, and the step portion extends in the circumferential direction of the output cover 21; and the joint module further includes a second sealing ring sleeved on the step portion.

The output cover 21 is fixedly matched with the external hole-shaped structure to output power, and the second sealing ring is used for improving the matching sealing performance of the output cover 21 and the external hole-shaped structure. The step portion penetrates through the peripheral edge of the end face of the output cover 21, so that the resistance when the output cover 21 just enters the external hole-shaped structure can be reduced, so that the output cover 21 can more smoothly enter the external hole-shaped structure, and the matching convenience of the output cover 21 and the external hole-shaped structure is improved.

After the second sealing ring is sleeved on the step portion, the second sealing ring may not protrude out of or partially protrude from the peripheral wall of the output cover 21, so that the friction force between the second sealing ring and the hole wall of the external hole-shaped structure can be reduced, and the second sealing ring can smoothly enter the external hole-shaped structure along with the output cover 21, so as to reduce the loading difficulty of the output cover 21 on the basis of improving the matching sealing performance of the output cover 21 and the external hole-shaped structure.

Figure 5:
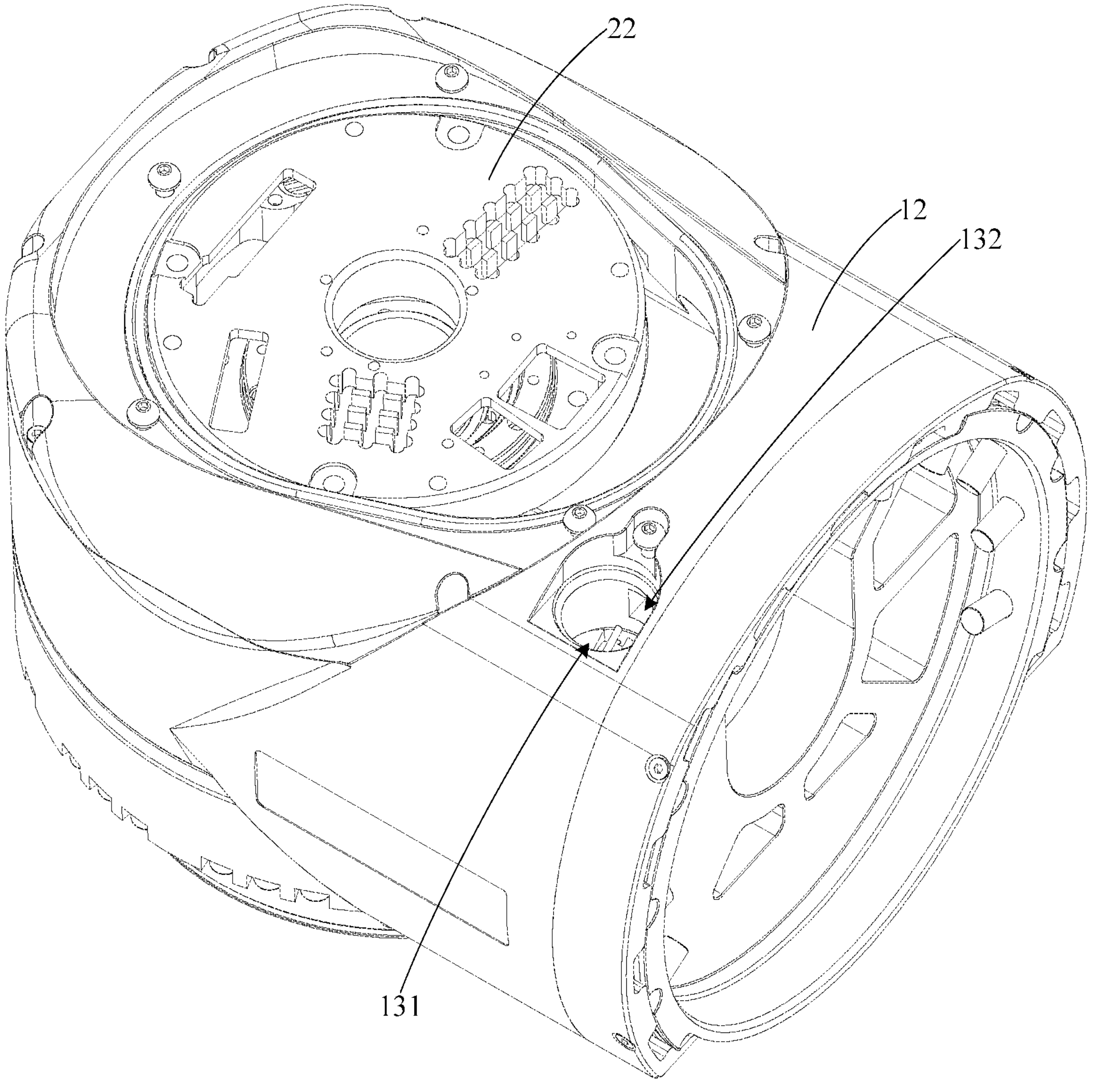
FIG. 5 is a schematic view of a second embodiment of a joint module of the present disclosure.
Figure 6:
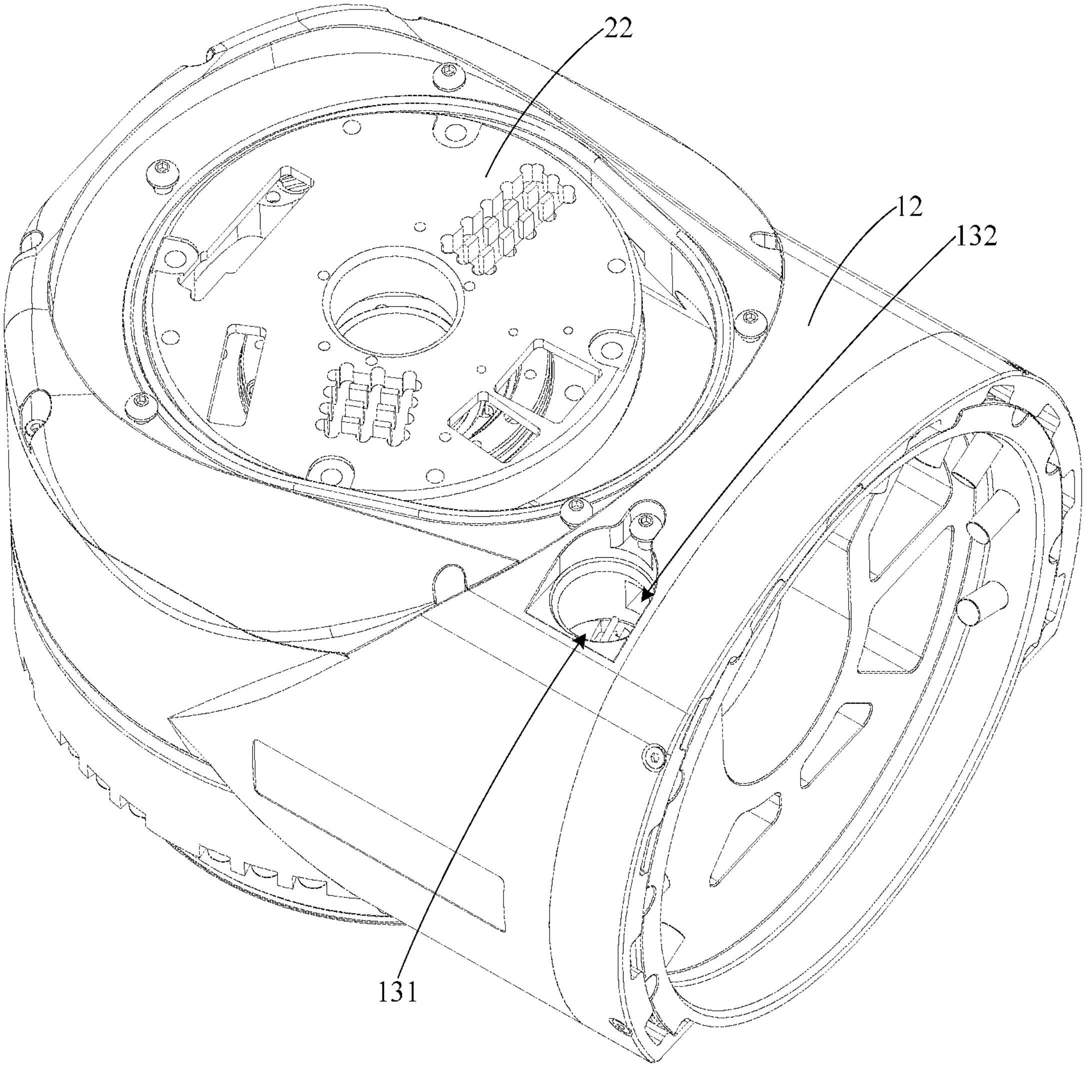
FIG. 6 is a schematic cross-sectional view of a second embodiment of a joint module of the present disclosure.

As shown in FIG. 5 and FIG. 6, an encoder is disposed at an end of the motor assembly 22 facing away from the reducer 23. A battery compartment is disposed at an end of the input sleeve 12 close to the joint mounting portion 11, and the battery compartment extends in an axial direction of the joint mounting portion 11. One end of the battery compartment penetrates through the peripheral wall of the input sleeve 12 to form a loading opening 131. A cavity wall of the battery compartment defines a wire passing hole 132 in communication with the joint mounting cavity, and a battery in the battery compartment is electrically connected to the encoder through the wire passing hole 132.

Since the battery compartment is located at the peripheral side of the joint mounting portion 11, it is only necessary to take out or load the battery through the loading opening 131 when the battery needs to be disassembled and assembled. The joint body 20 does not need to be taken out or the fixed end of the joint body 20 does not need to be opened, so that the disassembly and assembly process of the battery can be simplified, and the disassembly and assembly convenience of the battery is improved.

The joint module further includes a battery cover, and the battery cover is detachable or movably mounted at the loading opening 131 to open or close the loading opening 131. The battery cover can cover and protect the battery compartment, prevent external impurities such as dust from entering the battery compartment, and also prevent the battery from falling out easily, thereby effectively protecting the battery. When the battery cover closes the loading opening 131, the battery cover may only function as the cover battery compartment, or the battery may be simultaneously pressed.

Figure 7:
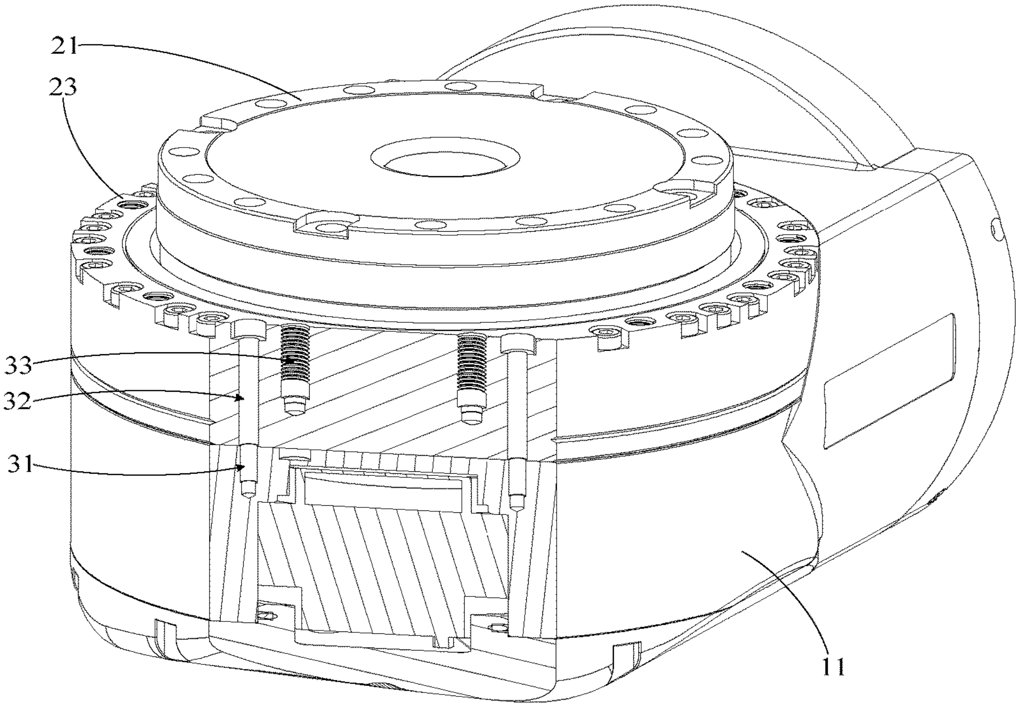
FIG. 7 is a schematic view of a third embodiment of a joint module of the present disclosure.
Figure 8:
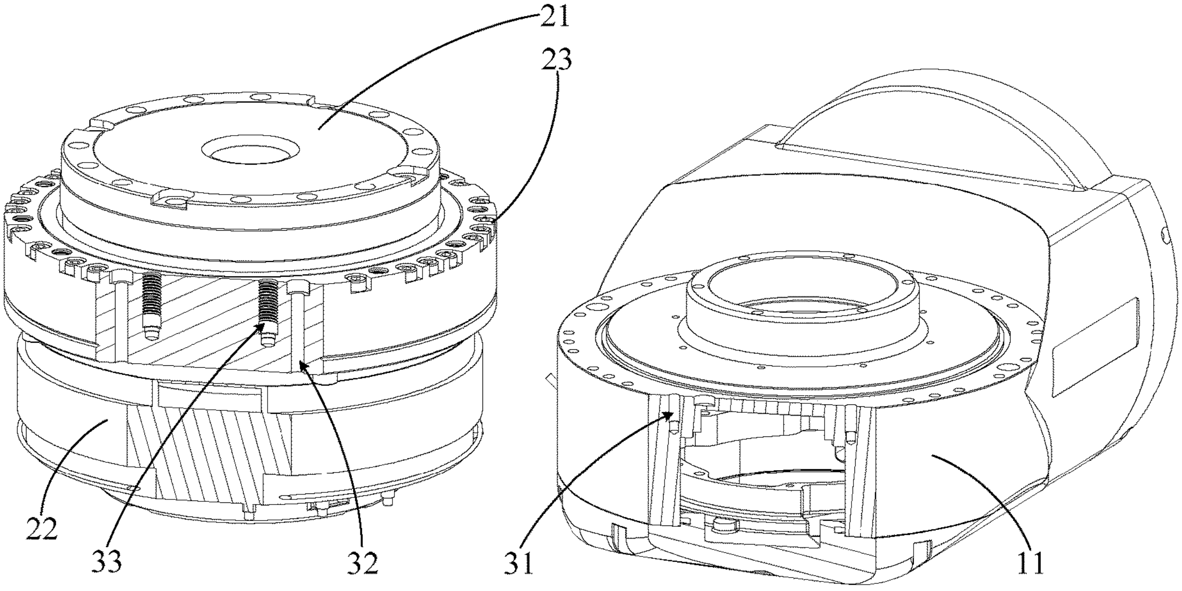
FIG. 8 is a schematic cross-sectional view of an embodiment of a joint module of the present disclosure.

As shown in FIG. 7 and FIG. 8, the speed reducer 23 is fixedly connected to an outer wall surface of the joint mounting portion 11 through a first connecting structure, a side of the speed reducer 23, facing away from the joint mounting portion 11, is provided with a second connecting structure, and the second connecting structure is configured to be fixedly connected to the external device. The first connecting structure and the second connecting structure are disposed independently of each other.

It can be understood that the non-moving part of the external device also needs to be connected to the non-output part of the speed reducer 23, so as to improve the connection stability between the external device and the speed reducer 23 and to prevent the output cover 21 from being stressed. The second connecting structure is disposed at a non-output portion of the speed reducer 23, and is configured to be connected to a non-moving portion of the external device, so as to implement a fixed connection between the external device and the speed reducer 23.

The first connecting structure and the second connecting structure are disposed independently of each other, that is, the connection process between the mounting shell 10 and the speed reducer 23 and the connection process between the mounting shell 10 and the external structure are separate. Since the first connecting structure and the second connecting structure are disposed independently of each other, the position and size of the first connecting structure do not need to adapt to the second connecting structure. The position requirement and the size requirement of the first connecting structure on the mounting shell 10 can be reduced, so that the area of the mounting shell 10 can be effectively utilized, and the size of the mounting shell 10 does not need to be increased, thereby reducing the occupied space of the mounting shell 10, and enabling the whole joint module to be more miniaturized and compact.

Specifically, as shown in FIG. 7 and FIG. 8, the first connecting structure includes a first connecting hole 31 and a second connecting hole 32, the first connecting hole 31 is disposed on an outer wall surface of the joint mounting portion 11, The second connecting hole 32 is disposed on a side of the speed reducer 23 facing away from the joint mounting portion 11, and penetrates through a side of the speed reducer 23 facing the joint mounting portion 11; and the first connecting hole 31 is connected to the second connecting hole 32 through a fastener.

The second connecting hole 32 penetrates through the two opposite end faces of the speed reducer 23 in the axial direction, the first connecting hole 31 is connected with the second connecting hole 32, and the first connecting hole 31 and the second connecting hole 32 are connected in series through the fastener, so that the connection process between the speed reducer 23 and the mounting shell 10 can be simplified. The first connecting hole 31 may be a threaded hole, a free end of the fastener may be a screw, and the fastener is in threaded fit connection with the first connecting hole 31, which may further reduce the difficulty of connection between the speed reducer 23 and the mounting shell 10 and improve the connection efficiency.

The second connecting structure includes a fixing hole 33, and the fixing hole 33 is configured to allow the fastening hole of the external device to be connected through a fastener. The fixing hole 33 may be a screw hole for the screw to be in threaded connection, so that the connection mode between the external device and the speed reducer 23 can be simplified, and the connection efficiency is improved.

Figure 9:
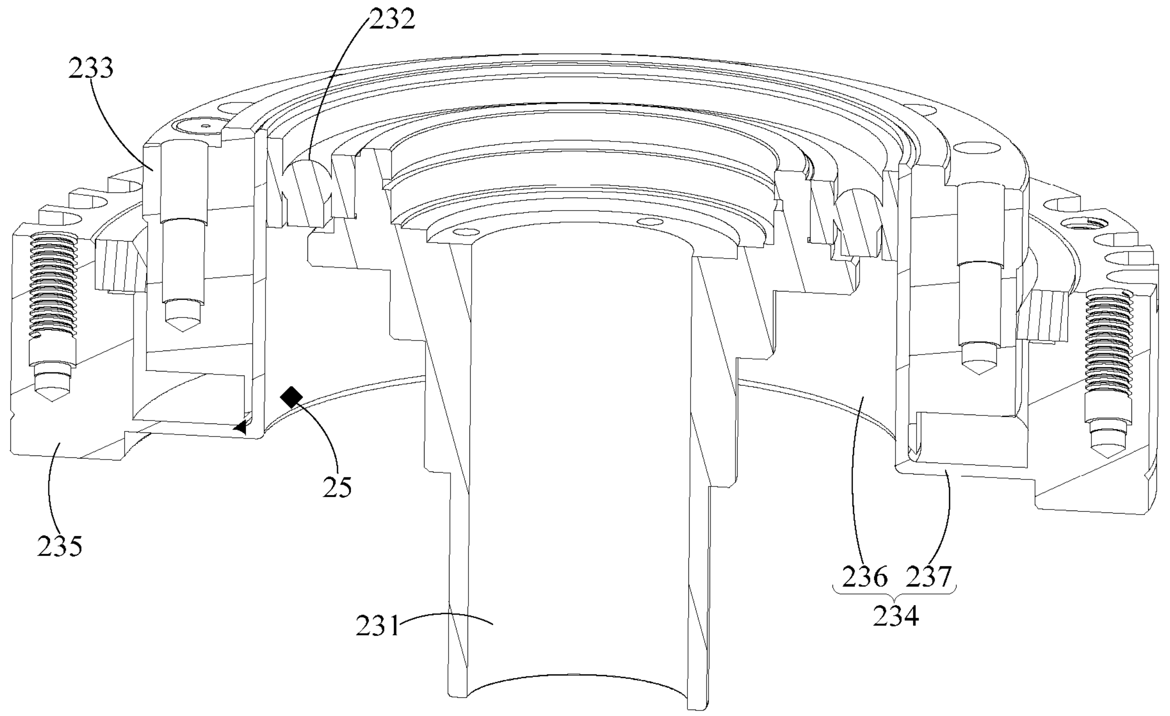
FIG. 9 is a schematic cross-sectional view of an embodiment of a speed reducer of the present disclosure.

As shown in FIG. 9, the speed reducer 23 includes an input shaft 231, a wave generator 232, a rigid wheel 233, a flexible wheel 234 and a support bearing 235. The wave generator 232 is sleeved on the input shaft 231 to rotate synchronously with the input shaft 231. The flexible wheel 234 is sleeved on the wave generator 232, and an outer gear ring is disposed on an outer peripheral wall of the flexible wheel 234. The rigid gear 233 is rotatably sleeved on the flexible gear 234, the inner peripheral wall of the rigid gear 233 is provided with an inner gear ring, and the inner gear ring is engaged with the outer gear ring. The supporting bearing 235 surrounds the rigid wheel 233. The flexible wheel 234 includes a transmission portion 236 and a connecting portion 237. The transmission portion 236 is sleeved on the wave generator 232, and the outer gear ring is disposed on the transmission portion 236. An inner peripheral edge of the connecting portion 237 is connected to one end of the transmission portion 236 far away from the outer gear ring, an outer peripheral edge of the connecting portion 237 is connected to an inner ring of the supporting bearing 235, and the first connecting structure and the second connecting structure are disposed on an outer ring of the supporting bearing 235.

The wave generator 232 is a member that causes the flexible gear 234 to generate a controllable elastic deformation for mutual pressing with the inner wall of the flexible gear 234. The flexible gear 234 is a thin-walled gear capable of generating large elastic deformation, and the diameter of the inner hole is slightly smaller than the long shaft of the wave generator 232. After the wave generator 232 is installed in the flexible gear 234, the cross section of the flexible gear 234 is forced to become an ellipse from the original circle, the teeth of the outer gear ring near the two ends of the long shaft are completely engaged with the inner gear ring of the rigid gear 233, and the teeth near the two ends of the short shaft are completely disengaged from the rigid gear 233. The teeth of the other segments on the perimeter are in the engaged and disengaged transition states. When the wave generator 232 continuously rotates, the deformation of the flexible gear 234 is continuously changed, so that the engagement state of the flexible gear 234 and the rigid gear 233 is continuously changed, and the engagement states are approach action, engagement, recess action, disengagement in turn, thereby realizing the rotation of the flexible gear 234 relative to the rigid gear 233 in the opposite direction of the wave generator 232. The support bearing 235 can support the flexible gear 234 to ensure stable operation of the speed reducer 23. The speed reducer 23 is connected to the mounting shell 10 and the external device via the outer ring of the bearing 235, which improves the effective utilization rate of the outer ring of the supporting bearing 235.

Figure 10:
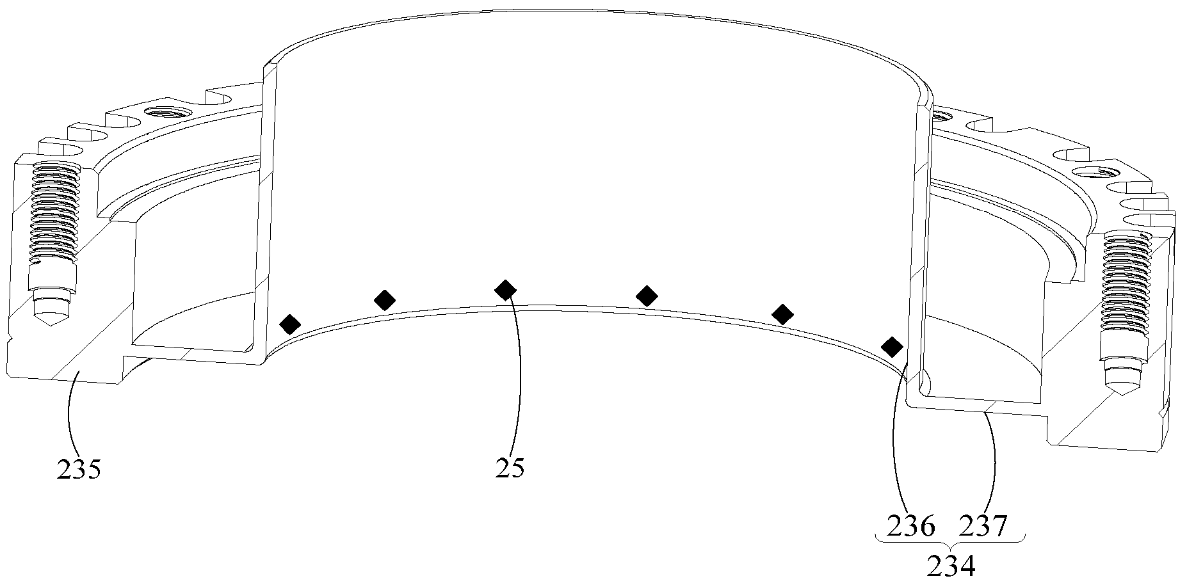
FIG. 10 is a schematic cross-sectional view of a flexible wheel and a support bearing of the present disclosure.

As shown in FIG. 10, the joint module further includes a magnetic attraction member 25, and the magnetic attraction member 25 is disposed at an end of an inner peripheral wall of the transmission portion 236 far away from the outer gear ring, to adsorb iron powder generated when the flexible gear 234 cooperates with the rigid gear 233 to move.

The magnetic attraction member 25 has an adsorption force on the metal particles such as the iron powder, so that the iron powder, generated by friction when the rigid gear 233 cooperates with the flexible gear 234 to move, can be adsorbed near the magnetic attraction member 25. It can be understood that although the magnetic attraction member 25 is mounted on the inner peripheral wall of the flexible gear 234, the iron powder, located on the outer peripheral side of the flexible gear 234, can be adsorbed by the flexible gear 234 under the action of the magnetic induction line. Since the magnetic attraction member 25 is located at one end of the flexible gear 234, far away from the outer gear ring, the distance between the adsorbed iron powder and the outer gear ring can be effectively increased, thereby preventing the iron powder from invading the space between the outer gear ring and the inner gear ring again, so as to reduce the wear of the rigid gear 233 and the flexible gear 234 to prolong the service life of the speed reducer 23.

A sufficient mounting space exists between the inner peripheral wall of the flexible gear 234 and the rotating shaft. The magnetic attraction member 25 is mounted on the inner peripheral wall of the flexible gear 234, which can avoid mutual interference between the magnetic attraction member 25 and other components of the speed reducer 23 or structures applied by the speed reducer 23. Thus, the producer does not need to additionally add the radial size of the flexible gear 234 for the magnetic attraction member 25, so as to avoid increasing the overall size of the speed reducer 23, thereby ensuring that the structure of the speed reducer 23 is simpler and more compact.

The magnetic attraction member 25 may be a magnet, for example, may be a permanent magnet such as a neodymium magnet or an electromagnet, and when the magnetic attraction member 25 is an electromagnet, it is more convenient to take down the iron powder adsorbed by the magnetic attraction member 25, but a related electronic control system needs to be added, which increases the production cost of the speed reducer 23.

Figure 11:
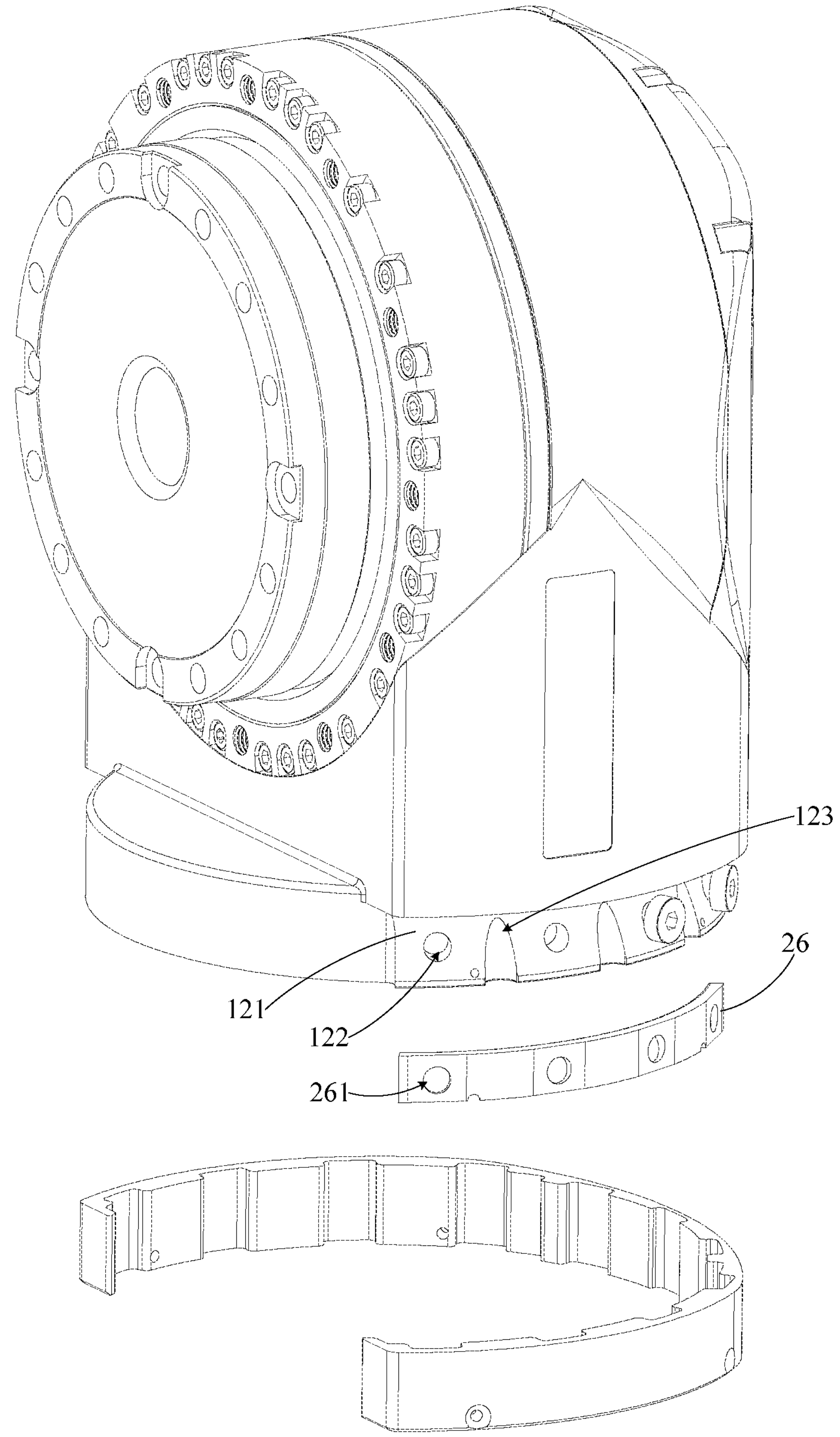
FIG. 11 is an exploded view of another embodiment of the joint module of the present disclosure.
Figure 12:
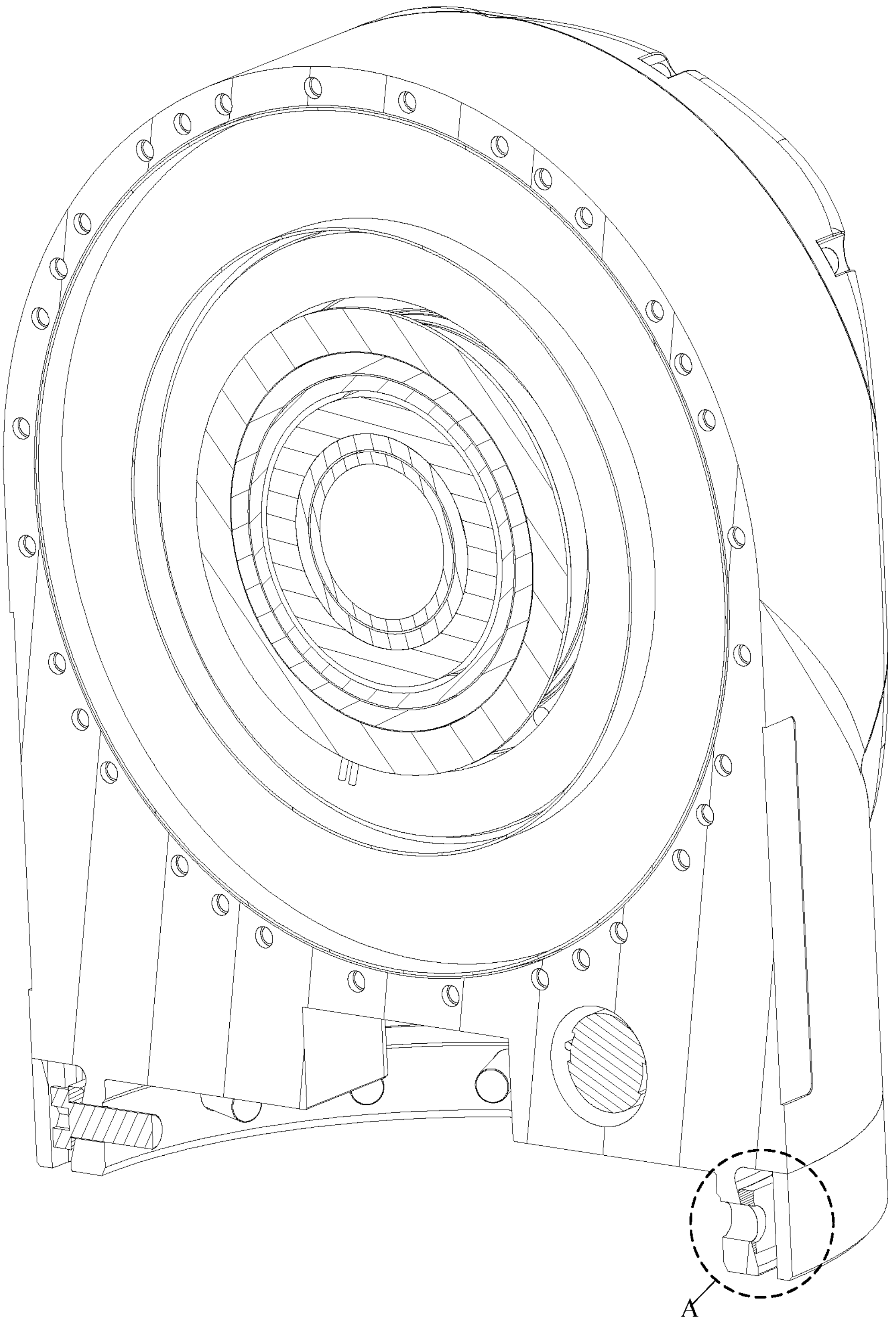
FIG. 12 is a schematic view of another embodiment of the joint module of the present disclosure.
Figure 13:
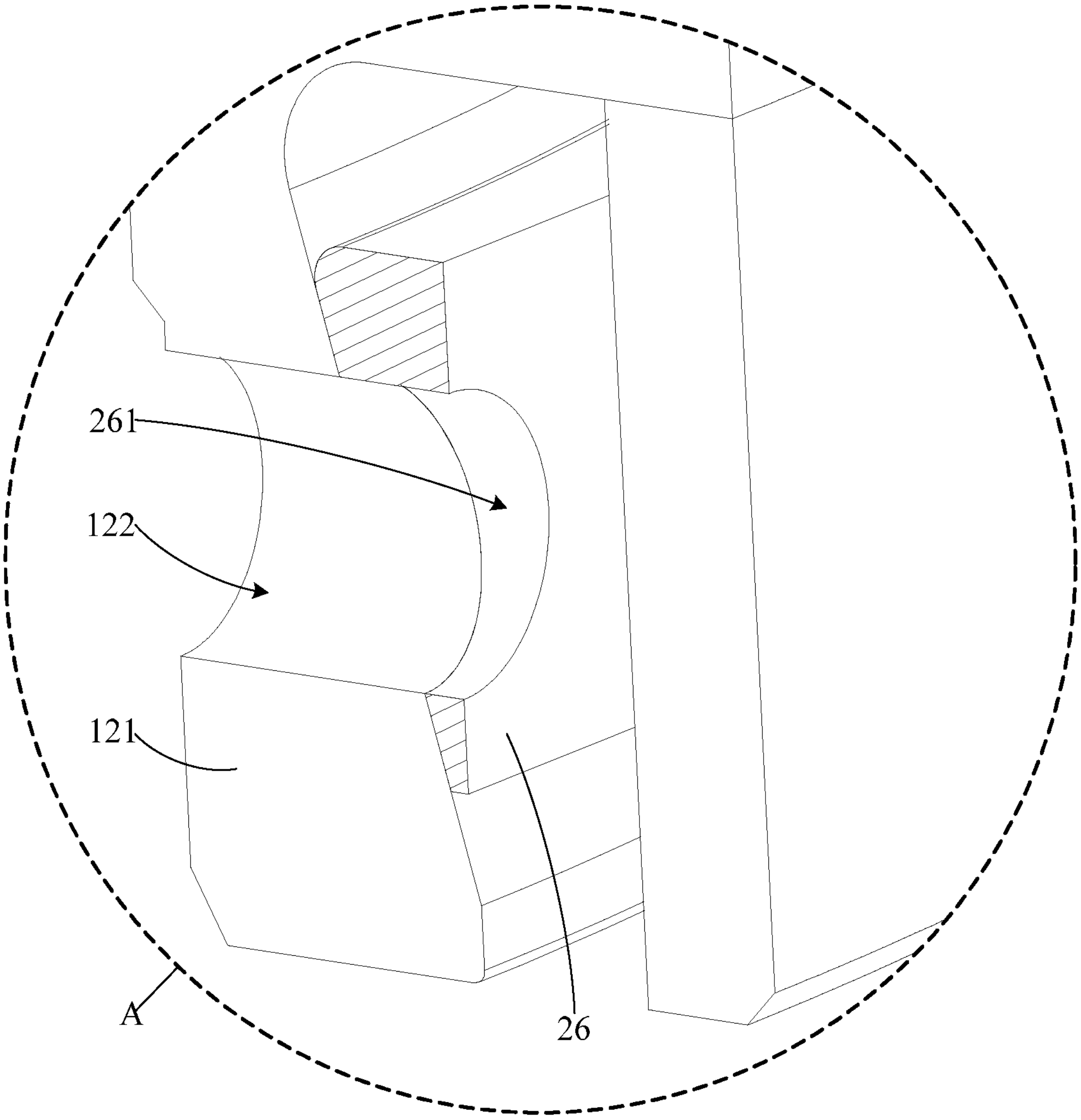
FIG. 13 is a partial enlarged view of an area A of FIG. 12.

As shown in FIG. 11 to FIG. 13, the outer peripheral wall of the input sleeve 12 is provided with a guide section 121. The outer diameter of the guide section 121 is gradually reduced from one side far away from the joint mounting portion 11 to one side close to the joint mounting portion 11. The guide section 121 defines a connecting hole 122 and a clearance groove 123, and the connecting hole 122 and the clearance groove 123 are disposed at intervals in the circumferential direction of the input sleeve 12.

The joint module further includes a fastening gasket 26, the fastening gasket 26 abuts against the guide section 121 and at least partially covers the clearance groove 123. A thickness of the fastening gasket 26 gradually increases from a side, far away from the joint mounting portion 11, toward a side, close to the joint mounting portion 11. The fastening gasket 26 defines a through hole 261 corresponding to the connecting hole 122, and the through hole 261 and the connecting hole 122 are configured to receive a fastener, so that the fastening gasket 26, the input sleeve 12 and the external power input structure sleeved by the input sleeve 12 are fastened and connected by the fastener.

The connecting hole 122 penetrates through the inner wall of the input sleeve 12, and the clearance groove 123 does not need to penetrate through the input sleeve 12. The fastening gasket 26 is disposed between the guide section 121 and the head of the first fastener 40*a*. The outer diameter of the guide section 121 gradually decreases from a side far away from the joint mounting portion 11 toward a side close to the joint mounting portion 11. The thickness of the fastening gasket 26 gradually increases from a side far away from the joint mounting portion 11 toward a side close to the joint mounting portion 11. When the first fastener 40*a* passes through the through hole 261 and the connecting hole 122 to be connected to the external power input structure, the fastening gasket 26 can move towards the joint mounting portion 11 along the guide section 121, and the first fastener 40*a* transfers the movement of the fastening gasket 26 to the external power input structure, thereby enabling the external power input structure to move towards the joint mounting portion 11 to enable the end surface of the external power input structure to abut against the end surface of the input sleeve 12 (enabling the gap between the end surface of the external power input structure and the end surface of the input sleeve 12 to disappear). In this way, the connection compactness between the external power input mechanism and the input sleeve 12 is improved, and the matching precision of the external power input mechanism and the input sleeve 12 is improved, which improves the transmission precision of the joint module. In addition, the clearance groove 123 is formed in the guide section 121, so that the part of the fastening gasket 26 corresponding to the clearance groove 123 can deform towards the inner side of the clearance groove 123, thereby enabling the fastening gasket 26 to abut against the guide section 121, to improve the guiding effect of the guide section 121 on the fastening gasket 26 and the first fastener 40*a*.

As shown in FIG. 14 to FIG. 20, the joint module includes a mounting shell 10, a joint body 20, and the fastening gasket 26. The mounting shell 10 includes a joint mounting portion 11 and an input sleeve 12 which are connected to each other. The joint mounting portion 11 defines a joint mounting cavity, and the input sleeve 12 is configured to be connected with an external power input structure, so that an external power input structure drives the joint module to move. The outer peripheral wall of the input sleeve 12 is provided with a guide section 121, and the outer diameter of the guide section 121 is gradually reduced from one side far away from the joint mounting portion 11 to one side close to the joint mounting portion 11. The guide section 121 defines a connecting hole 122 and a clearance groove 123, and the connecting hole 122 and the clearance groove 123 are disposed at intervals in the circumferential direction of the input sleeve 12.

The joint body 20 is mounted in the joint mounting cavity. The fastening gasket 26 abuts against the guide section 121 and at least partially covers the clearance groove 123, and a thickness of the fastening gasket 26 gradually increases from a side away from the joint mounting portion 11 to a side close to the joint mounting portion 11. The fastening gasket 26 defines a via hole 261 corresponding to the connecting hole 122, and the via hole 261 and the connecting hole 122 are configured to allow the first fastener 40*a* to pass through, so that the first fastener 40*a* fastens and connects the fastening gasket 26, the input sleeve 12, and the external power input structure sleeved by the input sleeve 12.

In this embodiment, the joint module is used as a robot joint for transmitting and sending driving force in the robot, so as to realize the movement of the execution part of the robot. There may be many external power input mechanisms, such as another joint module having a driving motor, or another driving device having a driving motor. The joint module may work independently to adjust an execution component of the robot, or may cooperate with each other to adjust an execution component of the robot.

The joint body 20 includes a motor assembly and a speed reducer connected in an axial direction, and an end of the speed reducer away from the motor assembly is provided with an output cover to serve as an output end of the joint body 20. The mounting shell 10 can be installed on an external support structure or an external power input structure, so as to realize the installation and cooperation of the joint module and the external structure. The joint mounting cavity is configured to receive the joint body 20, and the input sleeve 12 is configured to be connected to an external power input structure. After the external power input structure is loaded into the input sleeve 12, the input sleeve 12 is locked with the external power input structure by the first fastener 40*a*.

The connecting hole 122 penetrates through the inner wall of the input sleeve 12, and the clearance groove 123 does not need to penetrate through the input sleeve 12 to fasten the fastening gasket 26 between the guide section 121 and the head of the first fastener 40*a*. The outer diameter of the guide section 121 decreases from a side far away from the joint mounting portion 11 toward a side close to the joint mounting portion 11, and a thickness of the fastening gasket 26 is gradually increased from a side far away from the joint mounting portion 11 toward a side close to the joint mounting portion 11. When the first fastener 40*a* passes through the via hole 261 and the connecting hole 122 to be connected to the external power input structure, the fastening gasket 26 can move towards the joint mounting portion 11 along the guide section 121, and the first fastener 40*a* transmits the movement of the fastening gasket 26 to the external power input structure, thereby enabling the external power input structure to move towards the joint mounting portion 11, so as to enable the end surface of the external power input structure to abut against the end surface of the input sleeve 12 (enabling the gap between the end surface of the external power input structure and the end surface of the input sleeve 12 to disappear). In this way, the connection compactness between the external power input mechanism and the input sleeve 12 is improved, so that the matching precision of the external power input mechanism and the input sleeve 12 is improved, and the transmission precision of the joint module is improved. In addition, the clearance groove 123 is formed in the guide section 121, so that the part of the fastening gasket 26 corresponding to the clearance groove 123 is capable of deforming towards the inner side of the clearance groove 123, thereby enabling the fastening gasket 26 to abut against the guide section 121, so as to improve the guiding effect of the guide section 121 on the fastening gasket 26 and the first fastener 40*a*.

The number of the connecting holes 122 may be one, two or more, and the number and positions of the through holes 261 is equal to the number of the connecting holes 122.

Figure 15:
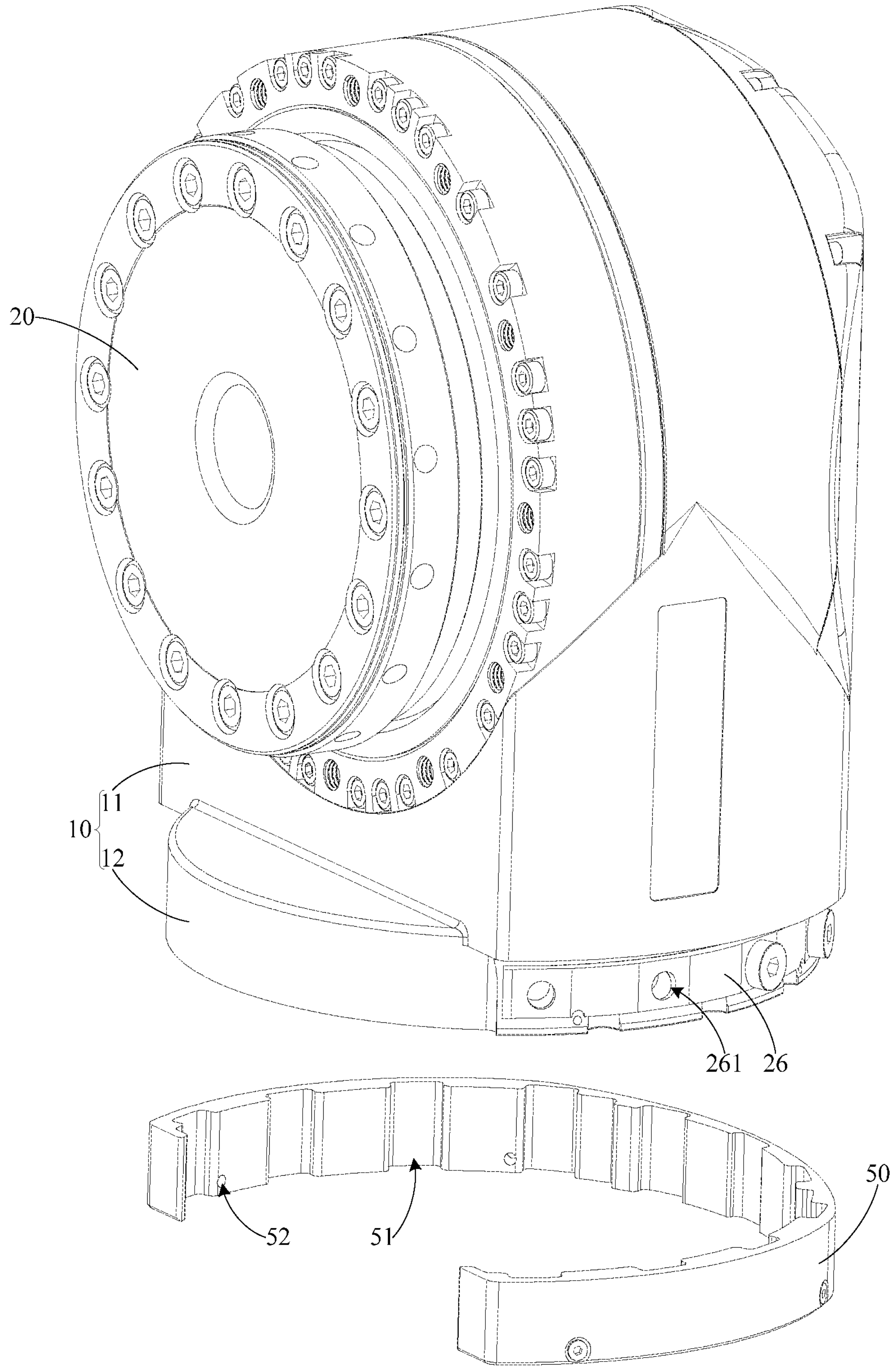
FIG. 15 is an exploded view of an embodiment of the joint module of the present disclosure.
Figure 16:
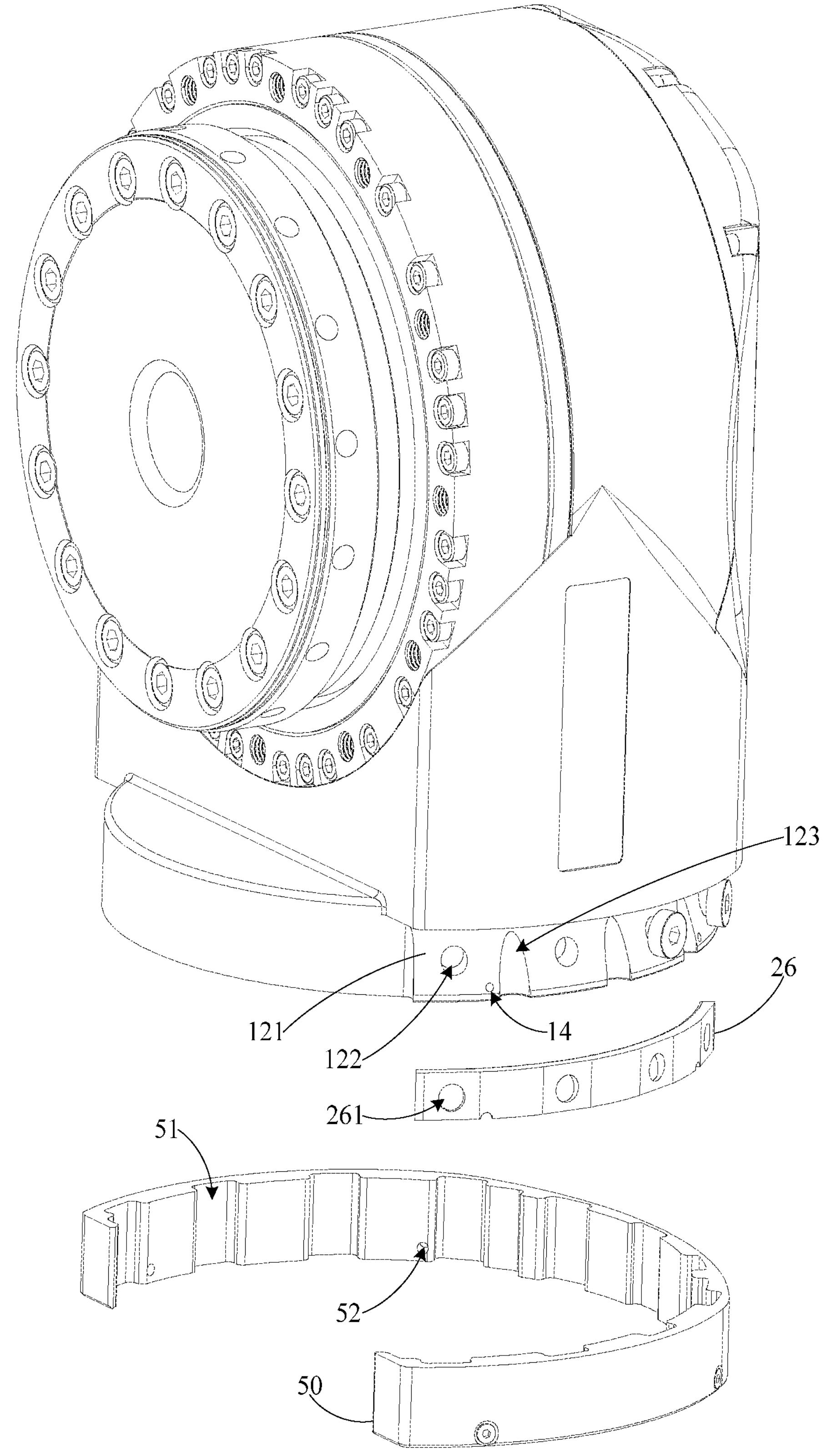
FIG. 16 is an exploded view of another embodiment of the joint module of the present disclosure.
Figure 17:
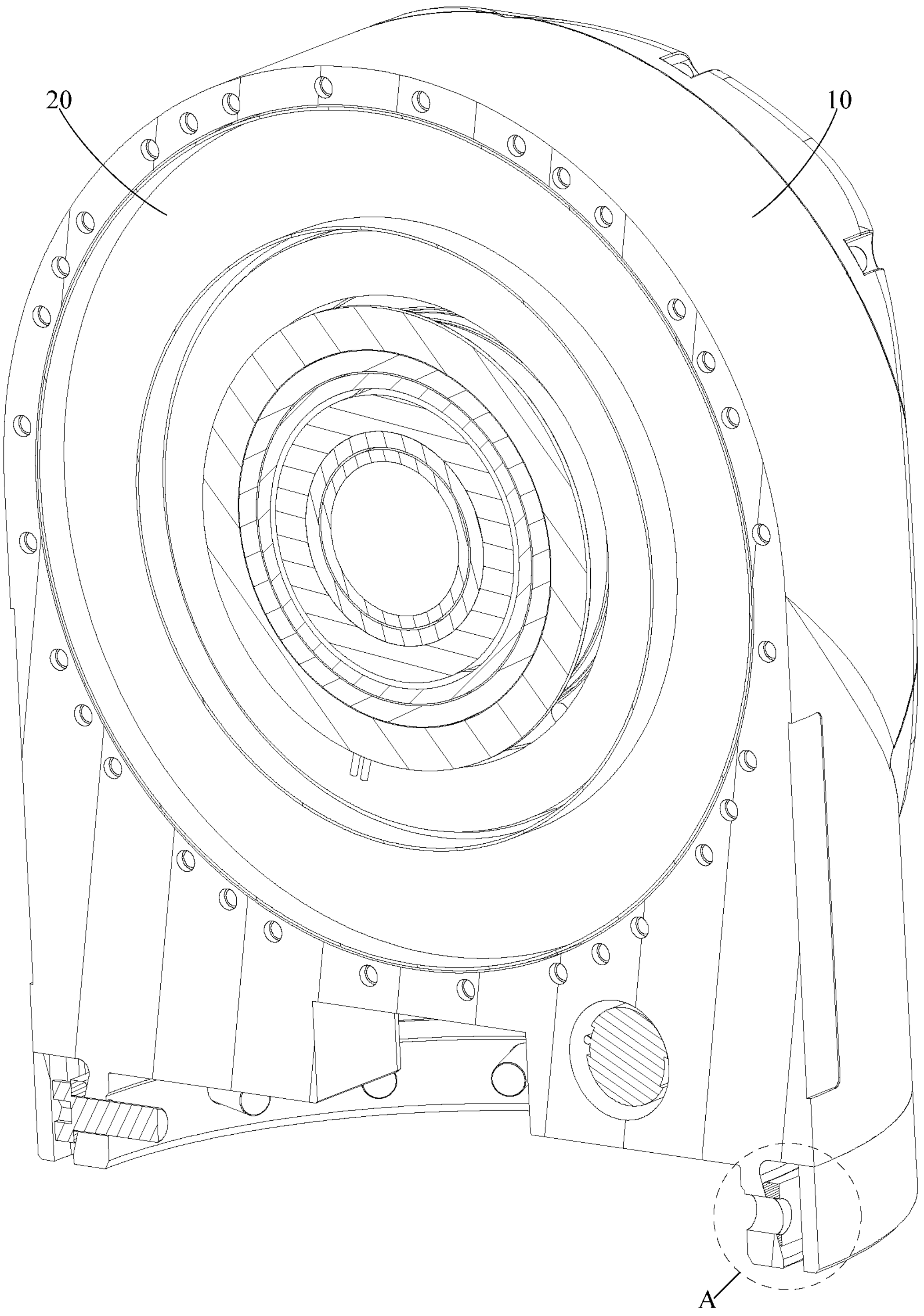
FIG. 17 is a schematic cross-sectional view of an embodiment of a joint module.
Figure 18:
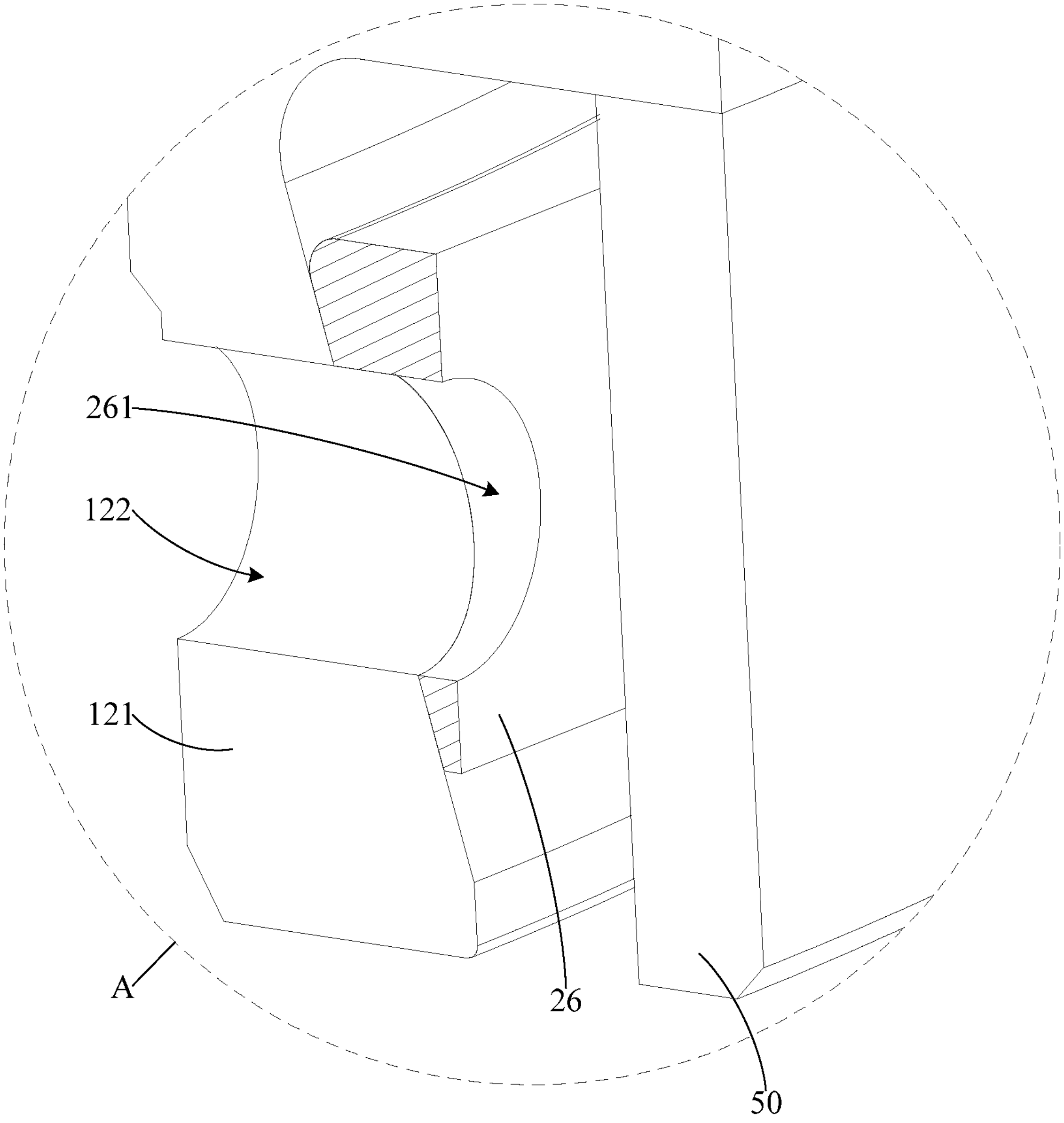
FIG. 18 is a partial enlarged view of an area A of FIG. 17.
Figure 19:
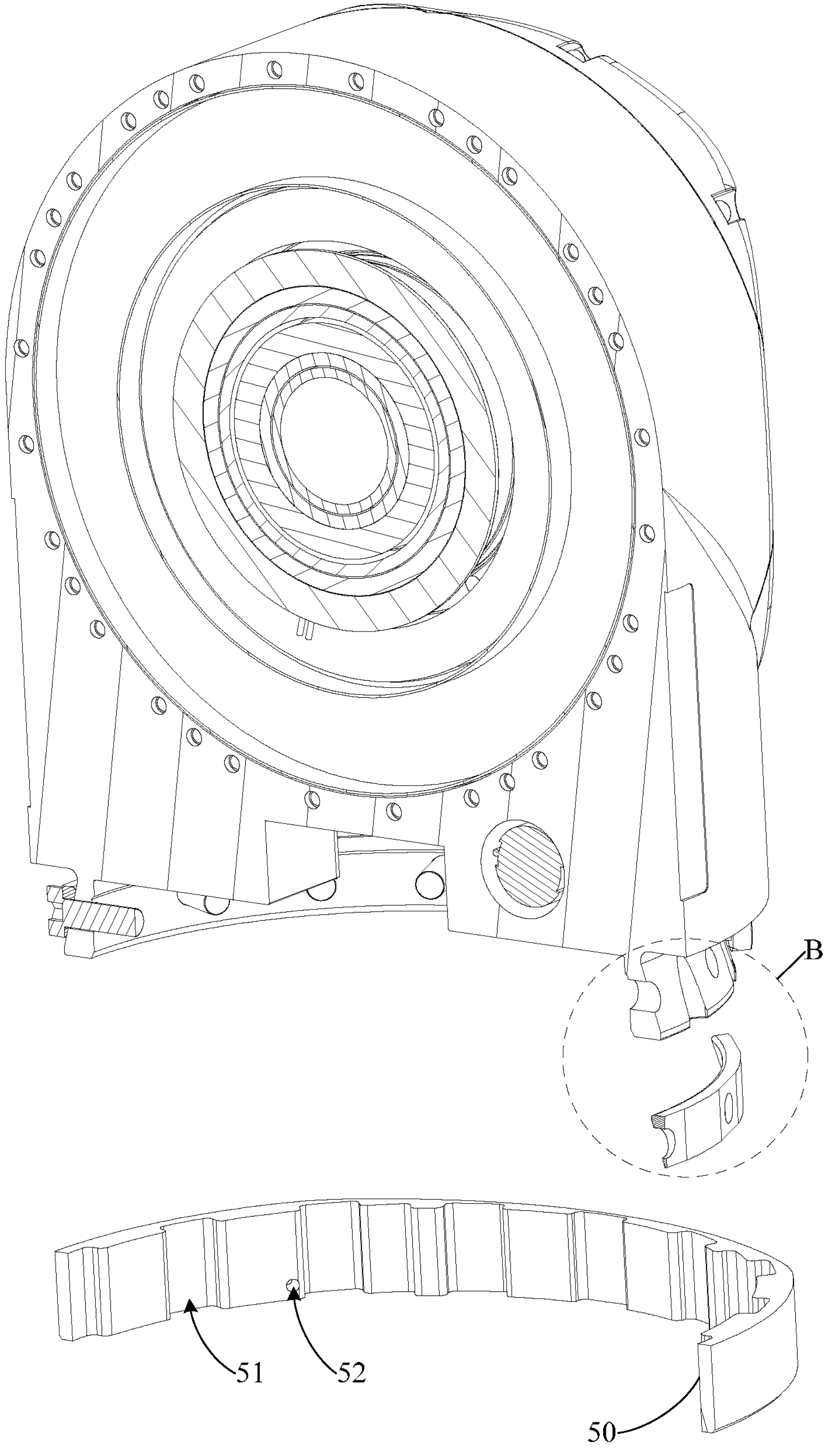
FIG. 19 is a schematic cross-sectional exploded view of an embodiment of a joint module of the present disclosure.
Figure 20:
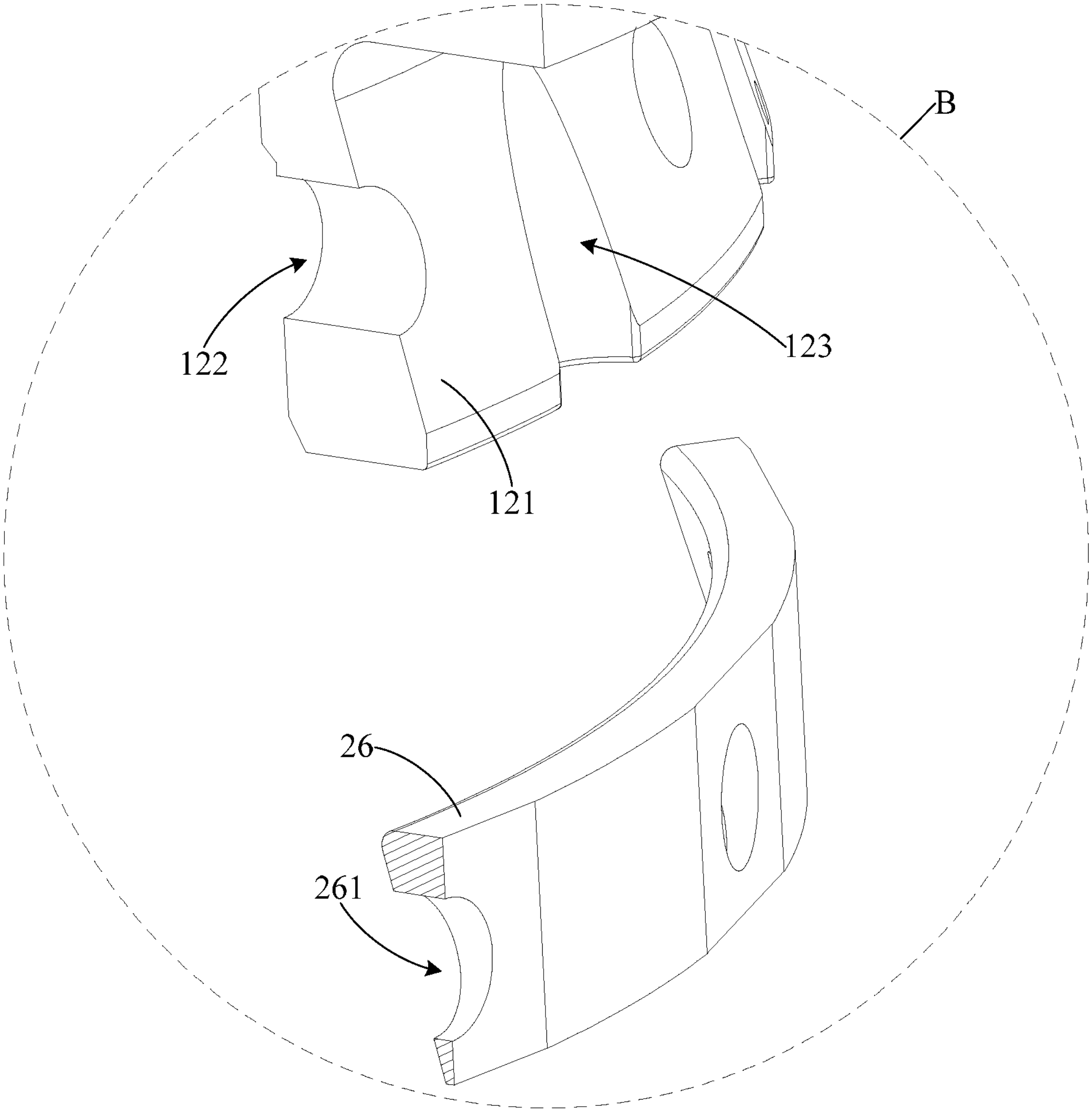
FIG. 20 is a partial enlarged view of an area B of FIG. 19.

Specifically, as shown in FIG. 15 and FIG. 16, there are a plurality of connecting holes 122. The plurality of connecting holes 122 are disposed at intervals in the circumferential direction of the input sleeve 12, and at least one clearance groove 123 is provided between two adjacent connecting holes 122. The fastening gasket 26 extends in the circumferential direction of the input sleeve 12. The number of the via holes 261 is equal to the number of the connecting holes 122 and the positions of the via holes 261 correspond to the positions of the connecting holes 122 respectively. The number of the first fastener 40*a* is equal to the number of the connecting holes 122. In this way, the abutting area of the fastening gasket 26 to the guide section 121 is increased to improve the abutting effect of the fastening gasket 26 on the guide section 121.

In practical applications, the included angle between the axis of the input sleeve 12 and the guide section 121 is set to be 5°-45°. For example, the included angle may be 8°, 12°, 15°, 16°, 18°, 19°, 22°, 25°, 27°, 30°, 33°, 35°, 37°, 40°, 43°, and the like. In this way, the convenience of guiding the external power input structure is improved.

Exemplarily, as shown in FIG. 15 to FIG. 18, the joint module further includes a reinforcing ring 50, the reinforcing ring 50 is sleeved on the input sleeve 12, and an inner peripheral wall of the reinforcing ring 50 is fixed to the fastening gasket 26. The reinforcing ring 50 may be an open ring or a closed ring, which is not limited herein, and only needs to satisfy that the inner peripheral wall of the reinforcing ring 50 may at least press the fastening gasket 26. In addition, the reinforcing ring 50 is also capable of hiding and protecting the head of the first fastener 40*a* to prevent the first fastener 40*a* from loosening due to the acting force from the external power input structure for a long time, so as to improve the fastening stability of the first fastener 40*a*.

Specifically, as shown in FIG. 15 to FIG. 18, an inner peripheral wall of the reinforcing ring 50 defines an clearance groove 51 corresponding to the via hole 261, and the clearance groove 51 is configured to receive a head of the first fastener 40*a*. The head of the first fastener 40*a* is exposed out of the via hole 261, and the head of the first fastener 40*a* is received in the clearance groove 51, thereby ensuring that other parts of the reinforcing ring 50 have sufficient crimping area to the fastening gasket 26, so as to reduce the interference of the head of the first fastener 40*a* to the reinforcing ring 50 and to improve the overall structural compactness of the joint module.

The reinforcing ring 50 may be fixed to the input sleeve 12 only in a snap-fit manner, or may be reinforced in another fastening manner.

For example, as shown in FIG. 15 and FIG. 16, the input sleeve 12 defines a fixing hole 14, the reinforcing ring 50 defines a through hole 52, and the through hole 52 is connected to the fixing hole 14 through a second fastener. In this way, the connection strength between the reinforcing ring 50 and the input sleeve 12 is improved, so as to improve the abutting stability of the reinforcing ring 50 to the fastening gasket 26.

The outer peripheral wall of the reinforcing ring 50 may be recessed relative to the outer peripheral wall of the mounting shell 10, or may protrude from the outer peripheral wall of the mounting shell 10.

Figure 14:
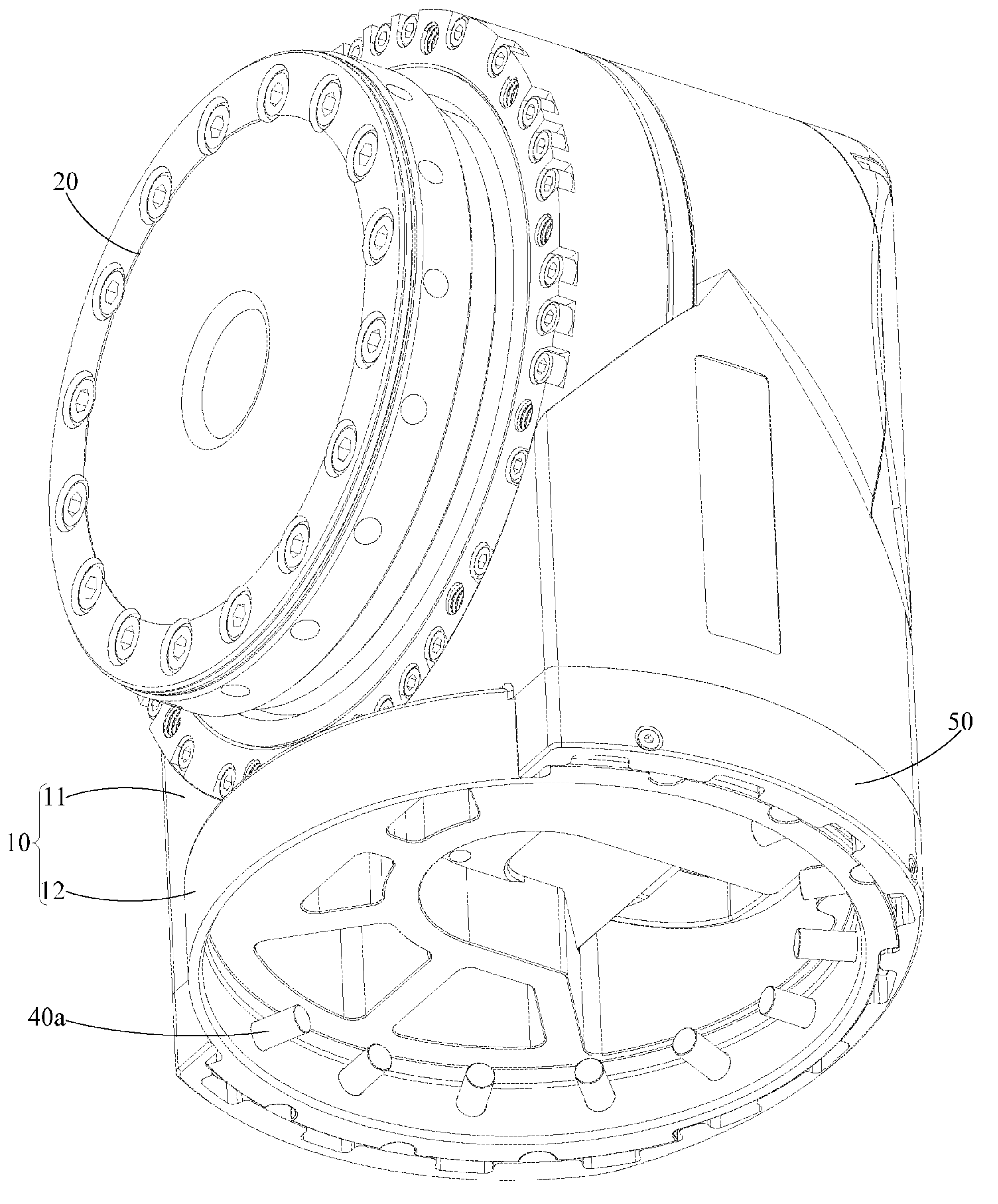
FIG. 14 is a schematic view of another embodiment of the joint module of the present disclosure.

Specifically, as shown in FIG. 14, an outer peripheral wall of the reinforcing ring 50 is flush with an outer wall surface of the mounting shell 10. In this way, the overall appearance integrity of the joint module is improved, and the reinforcing ring 50 is prevented from being hooked by the external structure to be stressed, so as to further improve the installation stability of the reinforcing ring 50.

The projection area of the deformation groove on the guide section 121 may be smaller than the projection area of the connecting hole 122 on the guide section 121, or may be equal to the projection area of the connecting hole 122 on the guide section 121.

For example, a projection area of the deformation groove on the guide section 121 is greater than a projection area of the connecting hole 122 on the guide section 121. In this way, the size of the notch of the deformation groove is increased as much as possible, so that the fastening gasket 26 generates more extrusion deformation towards the interior of the deformation groove, thereby further improving the abutting effect of the fastening gasket 26 on the guide section 121.

The axis of the input sleeve 12 may be parallel to the axis of the joint mounting portion 11, or may be perpendicular to the axis of the joint mounting portion 11.

Specifically, as shown in FIG. 14, the axis of the input sleeve 12 is perpendicular to the axis of the joint mounting portion 11, so that the direction of the external output motion of the joint body 20 is different from the driving direction of the external power input structure to the joint body 20, so that the application effect of the joint module is improved.

Figure 21:
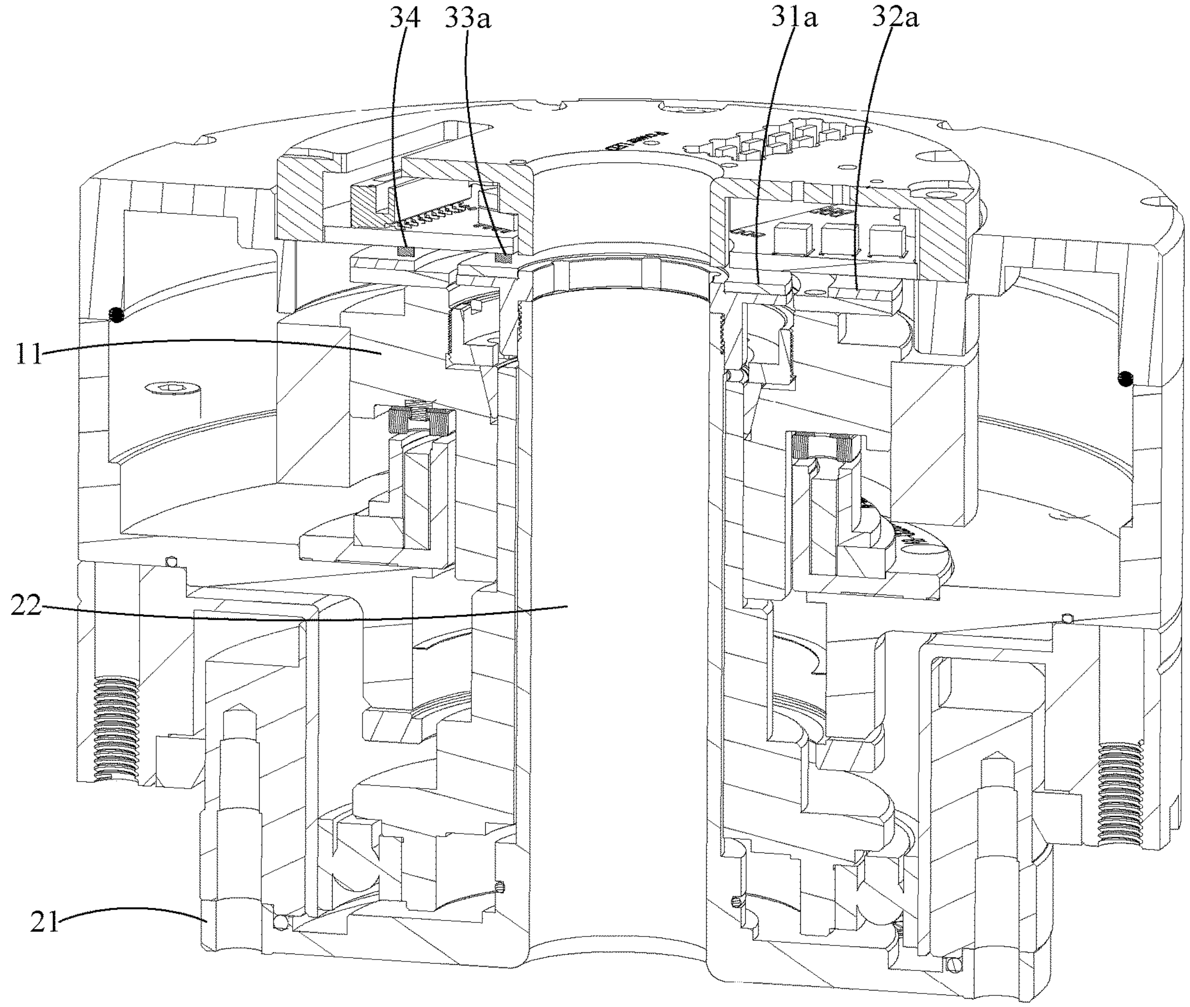
FIG. 21 is a schematic cross-sectional exploded view of an embodiment of a joint module of the present disclosure.
Figure 22:
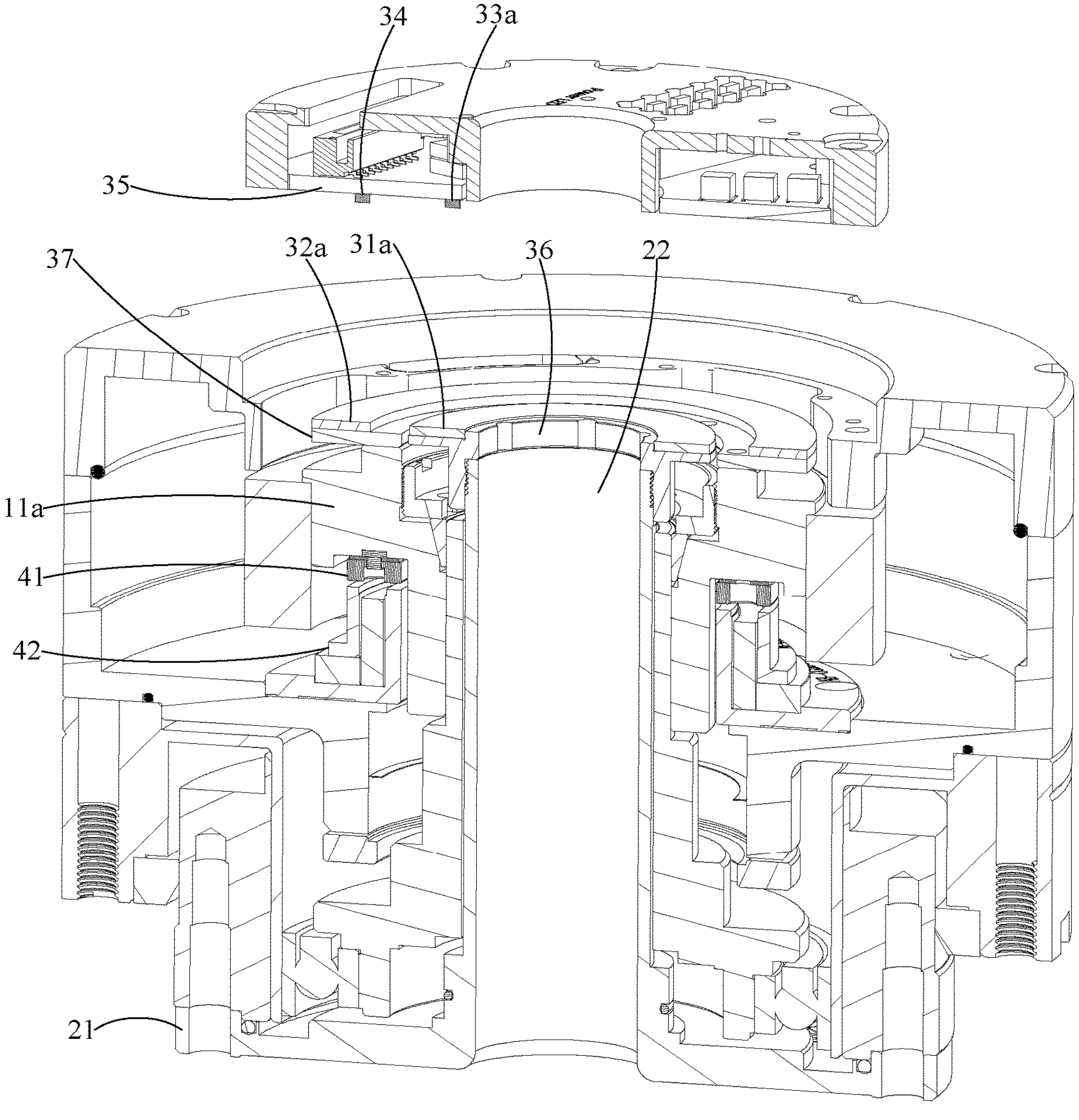
FIG. 22 is an exploded and schematic cross-sectional view of an embodiment of a joint module of the present disclosure.

As shown in FIG. 21 and FIG. 22, The joint body includes a motor assembly, a motor reducer, and an encoder. The motor assembly includes a housing, a motor stator and a motor rotor 11*a*. The motor stator is mounted in the housing, and the motor rotor 11*a* is rotatably mounted on an inner peripheral side of the motor stator. The speed reducer is mounted on one side of the motor assembly. The speed reducer includes an input shaft, an output cover 21 and an output shaft 22. The input shaft is matched with the motor rotor 11*a*, and the output cover 21 is disposed on the side of the speed reducer far away from the motor assembly. The output shaft 22 penetrates through the input shaft. One end of the output shaft 22 is connected to the output cover 21, and the other end of the output shaft 22 extends to the side, of the motor assembly far away from the speed reducer.

The encoder is mounted on a side of the motor assembly far away from the reducer. The encoder includes a first code disk 31*a*, a second code disk 32*a*, a first reading head 33*a* and a second reading head 34. The first code disk 31*a* is mounted at an end of the output shaft 22 far away from the output cover 21. The second code disk 32*a* is mounted on the motor rotor 11*a* and is annularly disposed on the first code disk 31*a*. The first reading head 33*a* is opposite to the first code disk 31*a* to read motion information of the first code disk 31*a*. The second reading head 34 is opposite to the second code disk 32*a* to read motion information of the second code disk 32*a*. A first spacing is formed between the first reading head 33*a* and the first code disk 31*a*, and a second spacing is formed between the second reading head 34 and the second code disk 32*a*, where the first spacing is greater than or less than the second spacing.

In this embodiment, the motor stator is fixedly installed in the shell, and the motor rotor 11*a* is capable of being rotatably matched with the shell through a bearing. Therefore, by means of the electromagnetic induction phenomenon, the motor rotor 11*a* is capable of rotating relative to the motor stator. The speed reducer is configured to adjust the motor rotor 11*a* to a preset rotation speed and then output the motor rotor 11*a* as work. Specifically, the input shaft is fixedly matched with the motor rotor 11*a* and is in differential fit with the output cover 21, so that the rotation speed of the output cover 21 is controlled at a preset value to meet the output requirement. The input shaft is inserted into the motor rotor 11*a* to rotate synchronously with the motor rotor 11*a*. The output shaft 22 rotates synchronously with the output cover 21, and the rotation angle of the output cover 21 is reflected by measuring the rotation angle of the output shaft 22.

One end of the output shaft 22 and one end of the motor rotor 11*a* are located on a side of the motor assembly far away from the reducer. The first code disk 31*a* and the second code disk 32*a* are annular. The first code disk 31*a* is mounted to one end of the output shaft 22 far away from the output cover 21 to rotate synchronously with the output shaft 22, and the second code disk 32*a* is mounted to an end of the motor rotor 11*a* far away from the speed reducer to rotate synchronously with the motor rotor 11*a*. The first reading head 33*a* is configured to read the rotation angle information (angular displacement) of the first code disk 31*a*, and the second reading head 34 is configured to read the rotation angle information (angular displacement) of the second code disk 32*a*.

The second code disk 32*a* surrounds the first code disk 31*a* to reduce the arrangement occupied space of the first code disk 31*a* and the second code disk 32*a*, and to simplify the installation modes of the first reading head 33*a* and the second reading head 34. So that the number of parts and the occupied space of the encoder are reduced, the internal structure of the joint module is simpler and more compact, and the torque density of the joint module is improved.

The encoder may be set as a magnetic absolute encoder. The magnetic absolute encoder is capable of directly obtaining the absolute position of the output shaft 22 and the motor rotor 11*a* compared with an incremental encoder, and is capable of resisting oil contamination and dust pollution and has higher reliability compared with a photoelectric encoder. Meanwhile, dual tracks are provided on both the first code disk 31*a* and the second code disk 32*a*. The outer ring track of the code disk is provided with $2^n$ pairs of magnetic poles, the inner ring track is provided with $2^n$-2 pairs of magnetic poles, and N poles and S poles are alternately formed on the track. In a dual-track format, when N=6, the outer ring track is divided into 64 pairs of magnetic pole pairs, the inner ring is divided into 62 pairs of magnetic pole pairs. The starting points of the inner ring track and the outer ring track are the same. When the rotation angle is measured, the corner position of the two tracks is accurately acquired by reading information on the two tracks, thereby improving the accuracy.

A first distance A1 is formed between the first code disk 31*a* and the first reading head 33*a*, a second distance A2 is formed between the second code disk 32*a* and the second reading head 34, and A1 is greater than or less than A2. That is, A1 and A2 are different. Since the radial sizes of the first code disk 31*a* and the second code disk 32*a* are different, the ranges of the generated magnetic induction lines are also different. At this time, A1 and A2 need to be correspondingly adjusted to enable the first reading head 33*a* to accurately read the first code disk 31*a*, and to enable the second reading head 34 to accurately read the second code disk 32*a*. In this way, the reading error caused by the size difference between the first code disk 31*a* and the second code disk 32*a* can be reduced, thereby improving the accuracy of reading results of the first code disk 31*a* and the second code disk 32*a* by the first reading head 33*a* and the second reading head 34.

For example, as shown in FIG. 22, the encoder further includes a circuit board 35. The first reading head 33*a* and the second reading head 34 are mounted on the same circuit board 35, which reduces the overall production cost of the joint module, makes the internal structure of the joint module more compact, and also reduces the installation difficulty of the first reading head 33*a* and the second reading head 34.

Specifically, protruding heights of the first reading head 33*a* and the second reading head 34 on the circuit board 35 are the same, and a surface of the first code disk 31*a* facing the circuit board 35 and a surface of the second code disk 32*a* facing the circuit board 35 are not flush with each other. The mounting process of the first reading head 33*a* and the second reading head 34 can be further simplified by making the surfaces of the first code disk 31*a* and the second code disk 32*a* facing the circuit board 35 different from each other to enable A1 to be different from A2.

In practical applications, a difference between the first spacing A1 and the second spacing A2 is 0.1 mm to 1 mm, such as 0.2 mm, 0.3 mm, 0.4 mm, 0.5 mm, 0.6 mm, 0.7 mm, 0.8 mm, or 0.9 mm. In this way, the difference between A1 and A2 is capable of being reasonably controlled, so as to ensure that the internal structure of the joint module is more compact under the condition that the accuracy of reading results of the first reading head 33*a* and the second reading head 34 is improved.

The first code disk 31*a* is directly mounted on the output shaft 22, or is indirectly mounted on the output shaft 22 through other structures.

Specifically, as shown in FIG. 22, the encoder further includes a connecting seat 36, the connecting seat 36 includes a connecting cylinder and a connecting ring, the connecting cylinder is connected to one end of the output shaft 22 far away from the output cover 21, the connecting ring is connected to the free end of the connecting cylinder, and the first code disk 31*a* is mounted on the connecting ring. The connecting cylinder is fixedly connected to the free end of the output shaft 22 in a threaded fit manner, and the connecting ring is connected to one end of the connecting cylinder close to the circuit board 35. The width of the connecting ring is greater than the width of the end surface of the output shaft 22, so that more connection areas can be provided for the first code disk 31*a* to improve the installation stability of the first code disk 31*a*.

The second code disk 32*a* is directly mounted on the motor rotor 11*a*, or is indirectly mounted on the motor rotor 11*a* through other structures.

For example, as shown in FIG. 22, the encoder further includes a support ring 37, the support ring 37 is connected to an end of the motor rotor 11*a* close to the encoder, and the second code disk 32*a* is mounted on the support ring 37. The support ring 37 defines a via hole, an end surface of the motor rotor 11*a* defines a fixing hole, and the via hole is connected to the fixing hole by a fastener, so as to realize a fixed connection between the support ring 37 and the motor rotor 11*a*. The width of the support ring 37 is greater than the width of the end surface of the motor rotor 11*a*, so that more connection areas can be provided for the second code disk 32*a* to improve the installation stability of the second code disk 32*a*.

For example, as shown in FIG. 22, the motor rotor 11*a* defines a mounting groove, and a notch of the mounting groove faces the speed reducer. The brake assembly further includes a brake assembly. The brake assembly is mounted in the housing. The brake assembly includes a brake pad 41 and an electromagnetic assembly 42, and the brake pad 41 is mounted in the mounting groove to rotate with the motor rotor 11*a*. The electromagnetic assembly 42 is mounted on one side of the brake pad 41 in the axial direction to attract or loosen the brake pad 41.

The brake assembly is configured to brake the motor rotor 11*a* to stop outputting work of the speed reducer. The electromagnetic assembly 42 is configured to attract or release the brake pad 41 by controlling the magnetic force. When the electromagnetic assembly 42 generates a magnetic force, the brake pad 41 moves or deforms towards the electromagnetic assembly 42, and the brake pad 41 is finally in contact with the electromagnetic assembly 42, thereby enabling the motor rotor 11*a* to stop by generating torque through friction, so as to brake the motor rotor 11*a*. When the electromagnetic assembly 42 loses the magnetic force, the brake pad 41 is released, so that the brake pad 41 rotates normally with the motor rotor 11*a*. It can be understood that the rotation stopping of the motor rotor 11*a* is due to the torque opposite to the rotation of the motor rotor 11*a* instead of axial pressure or radial pressure, which enables the rotation stopping process of the motor rotor 11*a* to be more stable.

The mounting groove may be formed on a portion of the electronic rotor surrounded by the motor stator, so that the direct stress position, where the motor rotor 11*a* is braked, is closer to the driven direct stress position, so that The force applied to the motor rotor 11*a* when the motor rotor 11*a* is braked is more uniform. The brake pad 41 may be in an annular shape, and the mounting groove also correspondingly extends along the circumferential direction of the motor rotor 11*a*. The brake pad 41 is mounted in the mounting groove instead of the end of the motor rotor 11*a*, which reduces the occupation of the axial space of the joint module by the brake assembly, so as to shorten the axial size of the joint module, thereby making the axial structure of the joint module more compact.

The electromagnetic assembly 42 is configured to control a magnetic field through a current. a magnetic field is generated when the electromagnetic assembly 42 is powered on, or a magnetic field is generated when the electromagnetic assembly 42 is powered off, which is not limited herein.

For example, as shown in FIG. 22, the electromagnetic assembly 42 includes a fixing base, an electromagnetic coil and a permanent magnet. The electromagnetic coil and the permanent magnet are mounted on the fixing base. The permanent magnet is configured to generate a magnetic attraction force to the brake pad 41, the electromagnetic coil is configured to generate a magnetic field opposite to the polarity of the permanent magnet when the electromagnetic coil powered on, and the fixing base has a friction surface corresponding to the brake pad 41.

The fixing base is in an annular shape and corresponds to the brake pad 41, and both the electromagnetic coil and the permanent magnet are in an annular shape and correspond to the fixing base. The permanent magnet is capable of generating a magnetic attraction force to the brake pad 41 to enable the brake pad 41 to move or deform towards the fixing base. The material of the brake pad 41 is not specifically limited, and only needs to be magnetically attracted by the permanent magnet. After the electromagnetic coil is powered on, a magnetic field opposite to the polarity of the permanent magnet is generated, and the magnetic field reduces the magnetic field of the permanent magnet, thereby reducing the magnetic attraction force of the permanent magnet to the brake pad 41 to enable the fixing base to release the brake pad 41.

That is to say, in the operation process of the motor rotor 11*a*, if the electromagnetic coil is kept energized, the brake pad 41 is not affected by the magnetic attraction of the permanent magnet. That is, the brake pad 41 cannot be attracted by the fixing base to be in contact with the friction surface, and at this time, the brake pad 41 rotates normally with the motor rotor 11*a*. If the electromagnetic coil is powered off, the electromagnetic coil does not generate a magnetic field, and the magnetic field of the permanent magnet is not affected, the magnetic attraction force of the permanent magnet to the brake pad 41 is restored. At this time, the brake pad 41 moves or deforms towards the fixed base, and the brake pad 41 is finally in contact with the friction surface, thereby enabling the motor rotor 11*a* to stop rotating by generating torque through friction, so as to brake the motor rotor 11*a*.

When the joint module needs to be controlled to work, the motor stator and the brake assembly are powered on together. At this time, the electromagnetic assembly 42 releases the brake pad 41, and the motor rotor 11*a* rotates. When the joint module needs to be controlled to stop, the motor stator and the brake assembly are powered off together. At this time, the motor rotor 11*a* loses the driving force, and the brake pad 41 is also attracted by the electromagnetic assembly 42, to enable the motor rotor 11*a* to stop faster.

The fixing base may be fixed by a peripheral wall of the housing, or may be fixed by an end wall of the housing, which is not limited herein. For example, as shown in FIG. 22, the fixing base is mounted on an end wall of the housing, and the electromagnetic assembly 42 partially extends into the mounting groove. The fixing base is mounted on the end wall of the housing, which simplifies the mounting manner of the electromagnetic assembly 42 in the housing. The electromagnetic assembly 42 partially extends into the mounting groove, which enables the internal structure of the motor assembly to be more compact.

In the technical solution of the joint module of the present application, the first code disk 31*a*, for measuring the rotation angle of the output cover 21 of the speed reducer, and the second code disk 32*a*, for measuring the rotation angle of the motor rotor 11*a*, are nested in the same plane, which reduces the occupied space of the encoder, and enables the first reading head 33*a* and the second reading head 34 to be disposed on the same circuit board. In addition, the internal structure of the joint module is simpler and more compact, and the torque density of the joint module can be improved. The first distance between the first reading head 33*a* and the first code disk 31*a* is set to be greater than or smaller than the second distance between the second reading head 34 and the second code disk 32*a*, which enables the first reading head 33*a* and the second reading head 34 to adapt to the size difference between the first code disk 31*a* and the second code disk 32*a*, thereby more accurately reading the rotation angle information of the first code disk 31*a* and the second code disk 32*a*, to enable the measurement results of the motor rotor 11*a* and the output shaft 22 to be more real and reliable.

The present application further provides a joint robot, and the joint robot includes a joint module. The specific structure of the joint module refers to the above embodiments. Since the joint robot adopts all the technical solutions of all the above embodiments, at least all beneficial effects brought by the technical solutions of the above embodiments are provided, and details are not described herein again.

In the technical solution of the joint module of the present application, the central axis of the joint mounting portion 11 is perpendicular to the central axis of the input sleeve 12, and the middle part of the projection of the output cover 21 on the input sleeve 12 does not protrude out of the peripheral edge of the input sleeve 12, which enables the overall shape of the joint module to be regular and compact, and enables mutual interference between the joint module and the external environment to be reduced, so as to improve the application effect of the joint module.

The above are only preferred embodiments of the present application, and are not intended to limit the present disclosure, any modification, equivalent replacement, improvement, etc. made within the spirit and principle of the present disclosure shall fall within the protection scope of the present disclosure.

Besides, it can be understood that, although the present disclosure is described according to the embodiments, each embodiment does not include only on dependent technology solution. The description of the present disclosure is only for clarity. The person skilled in the art should regard the present disclosure as an entirety. Technology solutions in the embodiments can be adequately combined to form other embodiments that can be understood by the person skilled in the art.

What is claimed is:

1. A joint module, comprising:

a mounting shell;

wherein the mounting shell comprises a joint mounting portion and an input sleeve connected to the joint mounting portion, the joint mounting portion defines a joint mounting cavity, and the input sleeve is configured to be connected to an external power input structure to enable the external power input structure to drive the joint module to move;

a central axis of the joint mounting portion is perpendicular to a central axis of the input sleeve;

the joint module further comprises a protecting cover, and a projection of the protecting cover on the input sleeve does not protrude from the peripheral edge of the input sleeve; and a joint body, wherein:

the joint body is partially mounted in the joint mounting cavity, the joint body has an output cover, the output cover is located out of the joint mounting cavity; and a middle part of a projection of the output cover does not protrude past a peripheral edge of the input sleeve.

2. The joint module according to claim 1, wherein an end of a peripheral wall of the output cover is provided with a step portion, and the step portion extends in a circumferential direction of the output cover; and the joint module further comprises a second sealing ring sleeved on the step portion.

3. The joint module according to claim 1, wherein;

the joint body comprises a motor assembly and a speed reducer connected to the motor assembly in an axial direction, the motor assembly is mounted in the joint mounting cavity, the speed reducer is mounted out of the joint mounting portion, and the output cover is mounted to the speed reducer;

the protecting cover is detachably covered at an end of the joint mounting portion disposed on a distal side to the output cover.

4. The joint module according to claim 3, wherein an outer wall of the joint mounting portion defines a first sealing groove disposed surrounding an opening of the joint mounting portion, the joint module further comprises a first sealing ring embedded in the first sealing groove, and an inner wall surface of the protecting cover abuts against the first sealing ring.

5. The joint module according to claim 3, wherein:

an end of the motor assembly disposed on a distal side to the speed reducer is provided with an encoder;

a battery compartment is provided at an end of the input sleeve adjacent to the joint mounting portion, the battery compartment extends in an axial direction of the joint mounting portion, and one end of the battery compartment, penetrating through a peripheral wall of the input sleeve, defines a loading opening; and a cavity wall of the battery compartment defines a wire passing hole in communication with the joint mounting cavity, and a battery in the battery compartment is electrically connected to the encoder through the wire passing hole.

6. The joint module according to claim 3, wherein:

the speed reducer is fixedly connected to an outer wall surface of the joint mounting portion via a first connecting structure, a side of the speed reducer disposed on a distal side to the joint mounting portion is connected to a second connecting structure, and the second connecting structure is configured to be fixedly connected to an external device; and the first connecting structure and the second connecting structure are independent of each other.

7. The joint module according to claim 6, wherein:

the speed reducer comprises an input shaft, a wave generator, a rigid wheel, a flexible wheel and a support bearing;

the wave generator is sleeved on the input shaft to rotate synchronously with the input shaft, the flexible wheel is sleeved on the wave generator, and an outer gear ring is disposed on an outer peripheral wall of the flexible wheel;

the rigid wheel is rotatably sleeved on the flexible wheel;

an inner circumferential wall of the rigid wheel is connected to an inner gear ring, the inner gear ring is engaged with the outer gear ring;

the flexible wheel comprises a transmission portion and a connecting portion, the transmission portion is sleeved on the wave generator, and the outer gear ring is disposed on the transmission portion;

an inner peripheral edge of the connecting portion is connected to one end of the transmission portion disposed on a distal side to the outer gear ring, and an outer peripheral edge of the connecting portion is connected to an inner ring of the supporting bearing; and the output cover is mounted on the rigid wheel, and the first connecting structure and the second connecting structure are disposed on an outer ring of the supporting bearing.

8. The joint module according to claim 7, wherein the joint module further comprises a magnetic attraction member, and the magnetic attraction member is disposed at an end of an inner peripheral wall of the transmission portion disposed on a distal side to the outer gear ring, for adsorbing iron powder generated when the flexible wheel cooperates with the rigid gear to move.

9. The joint module according to claim 1, wherein:

an outer peripheral wall of the input sleeve is provided with a guide section, an outer diameter of the guide section is gradually reduced from one side disposed on a distal side to the joint mounting portion to one side adjacent to the joint mounting portion;

the guide section defines a first connecting hole and a clearance groove, and the connecting hole and the clearance groove are disposed at intervals in a circumferential direction of the input sleeve; and the joint module further comprises a fastening gasket, the fastening gasket abuts against the guide section and at least partially covers the clearance groove, a thickness of the fastening gasket is gradually increased from one side disposed on a distal side to the joint mounting portion to another side adjacent to the joint mounting portion, the fastening gasket defines a first via hole corresponding to the first connecting hole, and the first via hole and the connecting hole are configured to receive a fastener to enable the fastener to fasten the fastening gasket, the input sleeve, and the external power input structure sleeved by the input sleeve.

10. The joint module according to claim 9, wherein a projection area of the clearance groove on the guide section is greater than a projection area of the connection hole on the guide section.

11. The joint module according to claim 9, wherein;

the guide section further defines a second connecting hole, the first connecting hole and the second connecting hole are disposed at intervals in a circumferential direction of the input sleeve, and the clearance groove is located between the first connecting hole and the second connecting hole; and the fastening gasket extends in the circumferential direction of the input sleeve, and the fastening gasket further defines a second via hole corresponding to the second connecting hole.

12. The joint module according to claim 11, wherein an included angle between an axis of the input sleeve and the guide section is set to be 5 degrees to 45 degrees.

13. The joint module according to claim 9, wherein the joint module further comprises a reinforcing ring, the reinforcing ring is sleeved on the input sleeve, and an inner peripheral wall of the reinforcing ring is pressed on the fastening gasket.

14. The joint module according to claim 13, wherein an inner peripheral wall of the reinforcing ring defines a clearance groove corresponding to the via hole, and the clearance groove is configured to receive a head of a first fastener.

15. The joint module according to claim 13, wherein the input sleeve defines a fixing hole, the reinforcing ring defines a through hole, a second fastener is mounted in the through hole and the fixing hole.

16. The joint module according to claim 13, wherein an outer peripheral wall of the reinforcing ring is flush with an outer wall surface of the mounting shell.

17. The joint module according to claim 1, wherein:

the joint module comprises a motor assembly, a speed reducer, and an encoder;

the motor assembly comprises a housing, a motor stator and a motor rotor;

the motor stator is mounted in the housing, and the motor rotor is rotatably mounted on an inner peripheral side of the motor stator;

the speed reducer is installed on one side of the motor assembly, the speed reducer comprises an input shaft, the output cover and an output shaft, the input shaft is matched with the motor rotor, the output cover is disposed on one side of the speed reducer disposed on a distal side to the motor assembly, the output shaft passes through the input shaft, one end of the output shaft is connected to the output cover, and another end of the output shaft extends to one side of the motor assembly disposed on a distal side to the speed reducer;

the encoder is mounted on a side of the motor assembly disposed on a distal side to the speed reducer, the encoder comprises a first code disk, a second code disk, a first reading head, and a second reading head, wherein the first code disk is installed at an end of the output shaft disposed on a distal side to the output cover, and the second code disk is installed on the motor rotor and surrounds the first code disk;

the first reading head is opposite to the first code disk to read motion information of the first code disk;

the second reading head is opposite to the second code disk to read motion information of the second code disk; and a first spacing is formed between the first reading head and the first code disk, and a second spacing is formed between the second reading head and the second code disk, wherein the first spacing is greater than or less than the second spacing.

18. The joint module according to claim 17, wherein a difference between the first spacing and the second spacing is 0.1 mm to 1 mm.

19. The joint module according to claim 17, wherein the encoder further comprises a connecting seat;

the connecting seat comprises a connecting cylinder and a connecting ring; and the connecting cylinder is connected to one end of the output shaft disposed on a distal side to the output cover, the connecting ring is connected to a free end of the connecting cylinder, and the first code disk is mounted on the connecting ring.

20. The joint module according to claim 17, wherein the encoder further comprises a support ring, the support ring is connected to an end of the motor rotor adjacent to the encoder, and the second code disk is mounted on the support ring.

21. The joint module according to claim 17, wherein the encoder further comprises a circuit board, and the first reading head and the second reading head are mounted on the circuit board.

22. The joint module according to claim 21, wherein a protruding height of the first reading head on the circuit board is the same as a protruding height of the second reading head on the circuit board; and a surface of the first code disk facing the circuit board and a surface of the second code disk facing the circuit board are not flush with each other.

23. The joint module according to claim 17, wherein a mounting groove is formed in the motor rotor, and a notch of the mounting groove faces the speed reducer;

the joint assembly further comprises a brake assembly;

the brake assembly is mounted in the housing; the brake assembly comprises a brake pad and an electromagnetic assembly, and the brake pad is mounted in the mounting groove to rotate with the motor rotor; and the electromagnetic assembly is mounted on one side of the brake pad in the axial direction to attract or loosen the brake pad.

24. The joint module according to claim 23, wherein the electromagnetic assembly comprises a fixing base, an electromagnetic coil, and a permanent magnet, the electromagnetic coil and the permanent magnet are mounted to the fixing base, the permanent magnet is configured to generate magnetic attraction force to the brake pad, the electromagnetic coil is configured to generate a magnetic field opposite to a polarity of the permanent magnet when the electromagnetic coil is powered on, and the fixing base has a friction surface corresponding to the brake pad.

25. The joint module according to claim 24, wherein the fixing seat is mounted on an end wall of the housing, and the electromagnetic assembly partially extends into the mounting groove.

26. A joint robot comprising a joint module, the joint module comprising:

a mounting shell, wherein:

the mounting shell comprises a joint mounting portion and an input sleeve connected to the joint mounting portion, the joint mounting portion defines a joint mounting cavity, and the input sleeve is configured to be connected to an external power input structure to enable the external power input structure to drive the joint module to move; and a central axis of the joint mounting portion is perpendicular to a central axis of the input sleeve;

the joint module further comprises a protecting cover, and a projection of the protecting cover on the input sleeve does not protrude from the peripheral edge of the input sleeve; and a joint body, wherein:

the joint body is partially mounted in the joint mounting cavity, the joint body has an output cover, the output cover is located out of the joint mounting cavity; and a middle part of a projection of the output cover does not protrude past a peripheral edge of the input sleeve.

* * * * *